United States Patent
Niu

(10) Patent No.: US 12,490,109 B2
(45) Date of Patent: Dec. 2, 2025

(54) MULTI-FREQUENCY BRIDGE CLIENT FOR BRIDGE WITH A SINGLE-FREQUENCY/MULTI-FREQUENCY BRIDGE COMMUNICATION DEVICE ON MULTIPLE FREQUENCY BANDS, METHOD THEREOF, AND COMMUNICATION SYSTEM

(71) Applicant: TP-LINK CORPORATION LIMITED, Hong Kong (HK)

(72) Inventor: Xuefeng Niu, Hong Kong (HK)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/424,828

(22) Filed: Jan. 28, 2024

(65) Prior Publication Data

US 2025/0247711 A1   Jul. 31, 2025

Related U.S. Application Data

(63) Continuation of application No. PCT/CN2022/108645, filed on Jul. 28, 2022.

(30) Foreign Application Priority Data

Jul. 28, 2021  (CN) .......................... 202110854736.5

(51) Int. Cl.
*H04W 16/14* (2009.01)
*H04W 8/00* (2009.01)
*H04W 88/06* (2009.01)

(52) U.S. Cl.
CPC ........... *H04W 16/14* (2013.01); *H04W 8/005* (2013.01); *H04W 88/06* (2013.01)

(58) Field of Classification Search
CPC ...... H04W 16/14; H04W 8/005; H04W 88/06
(Continued)

(56) References Cited

U.S. PATENT DOCUMENTS 9,420,524 B1 *  8/2016  Dalvi ................... H04W 48/16
10,225,338 B1 *  3/2019  Chu .................... H04W 56/007
(Continued)

FOREIGN PATENT DOCUMENTS

CN   103297952 A  *  9/2013
CN   107734717 A     2/2018
(Continued)

OTHER PUBLICATIONS

PCT/CN2022/108645, International Search Report and Translation, 7 pages, dated Sep. 20, 2022.
(Continued)

*Primary Examiner* — Mark G. Pannell
(74) *Attorney, Agent, or Firm* — LOEB & LOEB LLP

(57) ABSTRACT

Provided are a client communication method, a client, and a communication system. The client is configured to bridge with single-frequency bridging communication device on a plurality of frequency bands. The communication method includes: in response to a single-time bridge trigger operation, obtaining device information of communication devices on each frequency band, and respectively starting protocol interaction processes associated with the single-frequency bridging communication devices on the plurality of frequency bands; in response to determining that the protocol interaction process is completed on a first frequency band, obtaining configuration information on the first frequency band; determining configuration information on at least one other frequency band other than the first frequency band based on the configuration information on the first frequency band and device information of each
(Continued)

communication device on each frequency band; and bridging with the single-frequency bridging communication device on corresponding frequency bands by using these pieces of configuration information.

9 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,366,214 B2* | 7/2019 | Li | G06F 21/44 |
| 10,779,342 B2* | 9/2020 | Sahu | H04W 76/18 |
| 11,244,561 B1* | 2/2022 | Fuchs | H04W 12/68 |
| 2010/0195595 A1* | 8/2010 | Iwata | H04W 48/16 |
| | | | 370/329 |
| 2013/0094484 A1* | 4/2013 | Kneckt | H04W 48/16 |
| | | | 370/338 |
| 2013/0102260 A1* | 4/2013 | Lee | H04W 8/005 |
| | | | 455/73 |
| 2013/0170482 A1* | 7/2013 | Jung | H04W 48/16 |
| | | | 370/338 |
| 2013/0223341 A1* | 8/2013 | Kim | H04W 76/14 |
| | | | 370/328 |
| 2014/0079043 A1* | 3/2014 | Montemurro | H04W 52/0216 |
| | | | 370/338 |
| 2015/0181552 A1* | 6/2015 | Bajko | H04W 64/00 |
| | | | 455/456.2 |
| 2015/0249946 A1* | 9/2015 | Oh | H04W 36/0066 |
| | | | 370/331 |
| 2016/0014837 A1* | 1/2016 | Seo | H04W 76/18 |
| | | | 370/329 |
| 2017/0339548 A1* | 11/2017 | Moriya | H04W 48/16 |

FOREIGN PATENT DOCUMENTS

| | | |
|---|---|---|
| CN | 107852655 B | 2/2021 |
| EP | 3457756 A1 | 3/2019 |
| WO | 2018096383 A1 | 5/2018 |

OTHER PUBLICATIONS

Kevin Robinson et al: "Wi-Fi Simple Configuration Protocol and Usability Best Practices for the Wi-Fi Protected Setup(TM) Program", Version 2.0.1., 30 pages, Apr. 2011.
European Patent Office, Communication pursuant to Rule 164(1) EPC of Application No. EP 22848644, Oct. 21, 2024, 20 pageS.

* cited by examiner

MULTI-FREQUENCY BRIDGE CLIENT FOR BRIDGE WITH A SINGLE-FREQUENCY/MULTI-FREQUENCY BRIDGE COMMUNICATION DEVICE ON MULTIPLE FREQUENCY BANDS, METHOD THEREOF, AND COMMUNICATION SYSTEM

CROSS-REFERENCE TO RELATED APPLICATION(S)

This application is a continuation of International Patent Application No. PCT/CN2022/108645, filed on Jul. 28, 2022, which claims the priority to and benefits of Chinese Patent Application No. 202110854736.5, filed on Jul. 28, 2021. All the aforementioned patent applications are hereby incorporated by reference in their entireties.

TECHNICAL FIELD

The present disclosure relates to a field of communication technology, and more particularly, to a communication method of a multi-frequency bridge client, a device, a multi-frequency bridge client and a communication system.

BACKGROUND

A client and a communication device are bridged to implement wireless communication. At present, there are multi-frequency clients and multi-frequency communication devices (e.g., wireless access points (APs)) on the market. The multi-frequency clients and the multi-frequency APs may support bridge on 2.4 GHz frequency band, 5 GHz frequency band, and 6 GHz frequency band, as well as subsequent frequency bands that may be supported by Wi-Fi, to implement wireless communication. In the context of the present application, "client", "communication device", and "AP" all refer to a multi-frequency device.

Support of the multi-frequency client and the multi-frequency AP for the bridge function may include the following cases.

A first case: the client and the AP perform standard protocol interaction. In response to a single-time bridge trigger operation, the client and the AP perform standard protocol interaction. The process of protocol message interaction may be completed only on one frequency band, and the process of protocol message interaction cannot be completed on other frequency band(s), that is, at least one device (the client and/or the AP) is capable of completing the process of protocol message interaction, for acquiring configuration information on only one frequency band, and such device may be referred to in the present application as a single-frequency bridge client (i.e. a multi-frequency client for single-frequency bridge) or a single-frequency bridge AP (i.e. a multi-frequency AP for single-frequency bridge). For example, when using a wireless protection settings (WPS) mode to trigger a bridge operation between a multi-frequency bridge client and a single-frequency bridge AP, the single-frequency bridge AP will announce undergoing WPS on all frequency bands, but the multi-frequency bridge client will finally complete the interaction process of the WPS protocol message with the single-frequency bridge AP only on one frequency band, and cannot complete the interaction process of the WPS protocol message on the remaining frequency bands.

A second case: the client and the AP perform standard protocol interaction. In response to a single-time bridge trigger operation, the client and the AP perform standard protocol interaction, and may complete interaction processes of protocol messages respectively corresponding thereto on all frequency bands. That is, both devices (the client and the AP) may complete the interaction process of protocol message for bridging with each other on all frequency bands, and such device may be referred to as a multi-frequency bridge client or a multi-frequency bridge AP in the present application. For example, when using a wireless protection settings (WPS) mode to trigger a bridge operation between a multi-frequency bridge client and a multi-frequency bridge AP, the multi-frequency bridge AP will announce undergoing WPS on all frequency bands, and the multi-frequency bridge client will complete the interaction process of the WPS protocol message with the multi-frequency bridge AP on all frequency bands.

A third case: the client and a network configurator perform standard protocol interaction, and the AP is managed by the network configurator. In response to a single-time bridge trigger operation, the client performs standard protocol interaction with the network configurator, and acquires configuration information of the AP from the network configurator. If the client may acquire configuration information of the AP on only one frequency band, then at least one of the client and the AP is a single-frequency bridge device, that is, a single-frequency bridge client or a single-frequency bridge AP. On the contrary, if the client acquires configuration information on all frequency bands, then the client is a multi-frequency bridge client or the AP is a multi-frequency bridge AP. For example, in Wi-Fi easy connect technology, the network configurator scans a QR code of the client and triggers a bridge operation, and the client may acquire configuration information for the bridge operation from the network configurator. The protocol interaction process involved in the Wi-Fi easy connect technology may be briefly referred to as a Wi-Fi easy connect process.

In summary, the multi-frequency bridge client cooperates with the multi-frequency bridge AP, and in response to a single-time bridge trigger operation, the multi-frequency bridge client may be bridged with the multi-frequency bridge AP on all frequency bands. If at least one of the client and the AP is a single-frequency bridge device, a plurality of bridge trigger instructions (a plurality of triggers) are needed so that the client may be bridged to the AP on all frequency bands responsive to multiple times of bridge trigger operations.

In practical use, even if the client is a multi-frequency bridge device, when cooperating with a single-frequency bridge AP, multiple times of bridge trigger operations are needed so that the client may be bridged to the single-frequency bridge AP on all frequency bands responsive to the multiple times of bridge trigger operations. Meanwhile, after completing standard protocol interaction on one frequency band, the multi-frequency bridge client may have to wait for a duration exceeding the duration specified in the protocol (e.g., a specified duration corresponding to the WPS technology is 2 minutes) due to not knowing whether the AP to be bridged is a multi-frequency bridge AP or a single-frequency bridge AP, and the multi-frequency bridge client may terminate the protocol interaction process on the other frequency band(s) only after determining that standard protocol interaction cannot be completed on the other frequency band(s), the process of which is time-consuming with poor user experience.

SUMMARY

Aspects of the embodiments of the present disclosure aim to provide a communication method of a multi-frequency bridge client, a device, a multi-frequency bridge client and a communication system, which allow quick bridge with a single-frequency/multi-frequency bridge communication device (AP) on all frequency bands on the basis of corresponding standard protocols.

a first aspect, embodiments of the invention provide a communication method of a client is provided by the embodiment of present application. The client is used for bridging with a single-frequency bridge communication device on a plurality of frequency bands, and the communication method comprises: acquiring device information of respective communication devices on each frequency band among the plurality of frequency bands, in response to a single-time bridge trigger operation, and activating protocol interaction processes associated with the single-frequency bridge communication device on the plurality of frequency bands, respectively; acquiring configuration information on a first frequency band for bridging with the single-frequency bridge communication device, in response to determining that the protocol interaction process on the first frequency band is completed; determining configuration information on at least one other frequency band except for the first frequency band, based on the configuration information on the first frequency band and the device information of the respective communication devices on each frequency band among the plurality of frequency bands; and using the configuration information on the first frequency band and the determined configuration information on the at least one other frequency band, for bridging with the single-frequency bridge communication device on the first frequency band and the at least one other frequency band.

In a second aspect, embodiments of the invention provide a communication method of a client is provided by the embodiment of present application. The client is used for bridging with a communication device on a plurality of frequency bands, and the communication method comprises: activating protocol interaction processes on the plurality of frequency bands, respectively, in response to a single-time bridge trigger operation; acquiring configuration information on the first frequency band, and determining a stage of protocol interaction processes on respective other frequency bands except for the first frequency band, in response to determining that the protocol interaction process is completed on the first frequency band; determining time delays respectively corresponding to the respective other frequency bands, according to stages of the protocol interaction processes on the respective other frequency bands upon completing the protocol interaction process on the first frequency band; for each frequency band among the respective other frequency bands, determining whether a protocol interaction process on the frequency band is completed within the time delay corresponding to the frequency band; and in a case where none of the protocol interaction processes on the respective other frequency bands is completed within a time delay corresponding to each frequency band among the respective other frequency bands, terminating the protocol interaction processes on the respective other frequency bands, acquiring device information of respective communication devices on each frequency band among the plurality of frequency bands, determining configuration information on at least one other frequency band except for the first frequency band, based on the configuration information on the first frequency band and the device information of the respective communication devices on each frequency band, and using the configuration information on the first frequency band and the determined configuration information on the at least one other frequency band for bridging with the communication device on corresponding frequency bands.

In a third aspect, embodiments of the invention provide a communication method of a client is provided by the embodiment of present application. The client is used for bridging with a communication device on a plurality of frequency bands, and the communication method comprises: activating the protocol interaction processes on the plurality of frequency bands, respectively, in response to a single-time bridge trigger operation; during a protocol interaction process on a first frequency band among the plurality of frequency bands, determining whether the client and the interaction device of the protocol interaction process support a same private protocol; and in response to determining the client and the interaction device support the same private protocol, after completing the protocol interaction process on the first frequency band among the plurality of frequency bands, acquiring configuration information on the first frequency band and at least one other frequency band from the interaction device, stopping the protocol interaction process on other frequency bands except for the first frequency band, and using the configuration information on the first frequency band and the at least one other frequency band for bridging with the communication device on corresponding frequency bands.

In a fourth aspect, embodiments of the invention provide a client is provided by the embodiment of present application, which comprises a processor, a memory, and a computer program stored in the memory and configured to be executed by the processor, wherein, the processor, when executing the computer program, implements the communication method of the client according to any aspect as described above.

A communication system may be provided by embodiments of present application, which comprises at least one communication device and the above client.

As compared with the prior art, the communication method of the multi-frequency bridge client, the device, the multi-frequency bridge client, and the communication system according to the embodiments of the present disclosure, allow quick bridge with a single-frequency bridge communication device AP based on configuration information of other frequency bands except for the frequency band on which interaction is completed and obtained by using an SSID-based retrieval method during communication with the single-frequency bridge AP. In addition, a bridge type of the communication device AP may be determined based on the stage of a protocol interaction process on each frequency band, to determine whether to use the SSID retrieval method or to wait for a preset time delay to acquire configuration information of at least some of other frequency bands, in order to complete bridge with the AP on the at least some of frequency bands, which may implement compatibility of communication with a single-frequency bridge communication device and a multi-frequency bridge communication device. Moreover, configuration information of all frequency bands may be acquired from the network configurator or the AP which the client is communicating based on support for a private protocol, so as to further quickly complete bridge with the AP on all frequency bands.

DETAILED DESCRIPTION

The technical solutions in the embodiments of the present disclosure will be described in a clearly and fully understandable way in connection with the drawings in the embodiments of the present disclosure. It is obvious that the described embodiments are just a part but not all of the embodiments of the present disclosure. Based on the embodiments in the present disclosure, those ordinarily skilled in the art can acquire other embodiment(s), without any inventive labor, which should be within the scope of the present disclosure.

In some specific embodiments, the multi-frequency bridge client may operate at two frequencies, for example, 2.4 GHz and 5 GHz, and thus is referred to as a dual-frequency client.

Figure 1:
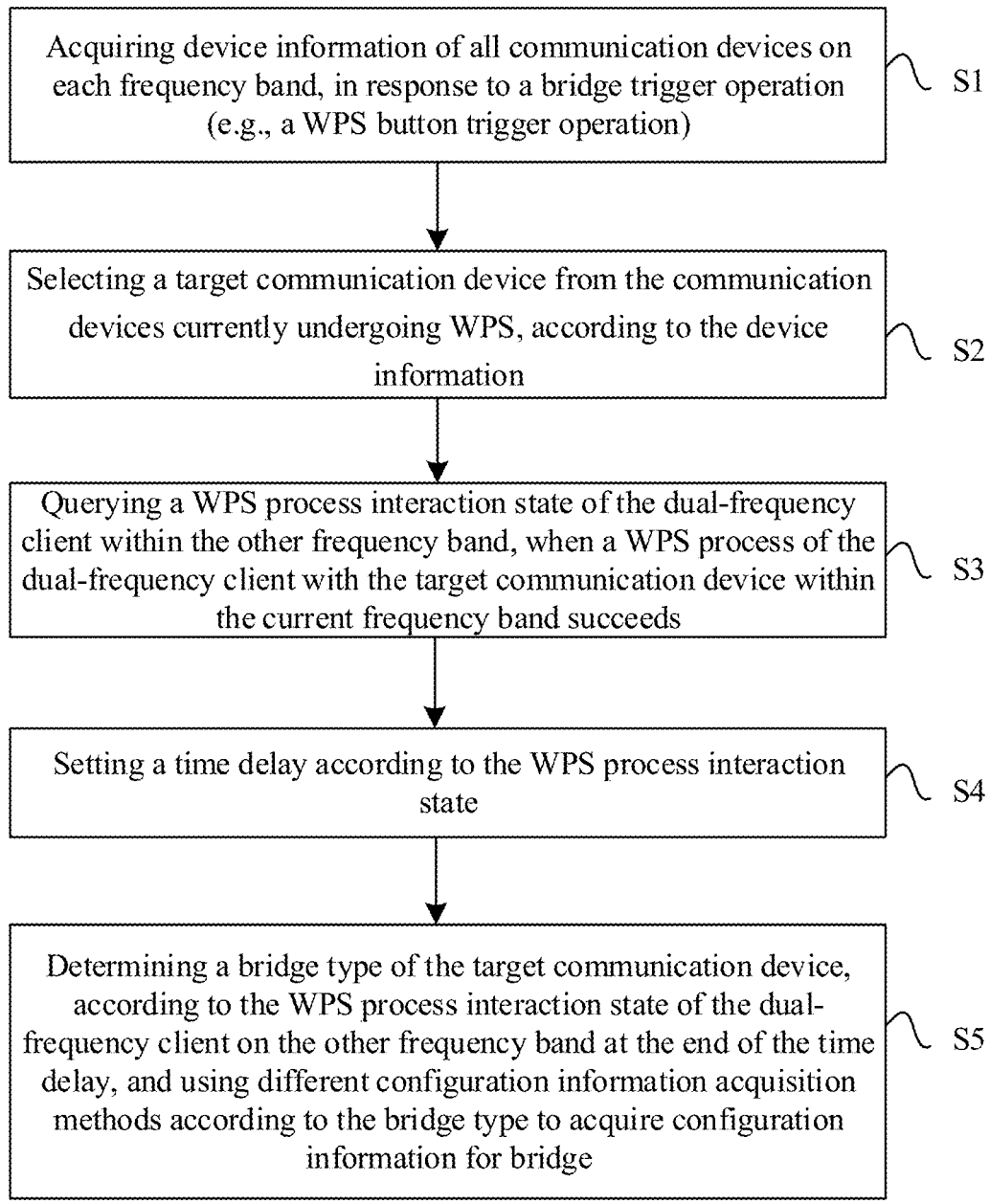
FIG. 1 is a flowchart of a communication method of a client provided by an embodiment of the present disclosure.

Referring to FIG. 1, FIG. 1 is a flowchart of a communication method of a dual-frequency client provided by an embodiment of the present disclosure. The dual-frequency client may operate on two frequency bands, may be bridged with a communication device AP on these two frequency bands, and may acquire configuration information on each frequency band required for bridge through a WPS mode. The communication method of the dual-frequency client may include steps below.

In step S1, device information of all communication devices on each frequency band is acquired, in response to a bridge trigger operation (e.g., a WPS button trigger operation).

In step S2, a target communication device is selected from the communication devices currently undergoing WPS, according to the device information.

In step S3, when a WPS process (a WPS technology related process, which may be briefly referred to as a WPS process) of the dual-frequency client with the target communication device on current frequency band succeeds, querying a WPS process interaction state of the dual-frequency client on the other frequency band.

In step S4, a time delay is set according to the WPS process interaction state.

In step S5, a bridge type of the target communication device is determined, according to the WPS process interaction state of the dual-frequency client on the other frequency band at the end of the time delay, and using different configuration information acquisition methods according to the bridge type to acquire configuration information, for bridging the dual-frequency client with the target communication device on the other frequency band.

It is noted that the dual-frequency client according to the embodiment of the present disclosure may operate on the 2.4 G frequency band and the 5 G frequency band. When connected with a communication device, the dual-frequency client needs to have its own WPS button pressed down to establish a connection with the communication device. Exemplarily, the dual-frequency client is a client such as a mobile phone, a computer, a relay (RE), etc., and the communication device may be a wireless access point (AP).

Specifically, in step S1, full channel scan is activated in response to a WPS button trigger operation, to create a temporary device information table. The temporary device information table is used to save device information of the scanned communication devices currently undergoing WPS, and the device information may include a service set identifier (SSID), a universally unique identifier (UUID), and a MAC address.

Exemplarily, when currently undergoing WPS, the dual-frequency client will perform full channel active scan on both frequency bands, to acquire information of nearby communication devices, and screen out communication devices currently undergoing WPS. During scanning, the dual-frequency client creates two temporary device information tables to save device information of communication devices currently undergoing WPS on the 2.4G frequency band and on the 5G frequency band, respectively.

Specifically, after starting WPS, a communication device sends a message containing WPS related information to the dual-frequency client on two frequency bands simultaneously, to notify the dual-frequency client that it has activated WPS. The relevant information includes the device information.

Exemplarily, after activating the WPS process, the communication device sends a beacon and a probe response carrying WSC_IE on two frequency bands simultaneously, which also includes device information of the communication device, to notify the dual-frequency client that it has activated WPS. It is noted that WSC_IE is a WPS field that contains WPS related information and device information (SSID, UUID, MAC address), where, the Device Password ID value represents a type of WPS (PBC, PIN), and the Selected Registrar value of 1 represents the communication device activating WPS. The dual-frequency client screens a communication device that activates WPS through these pieces of information. The beacon is an active broadcast notification, and the probe response is a response to a probe request sent by the dual-frequency client.

Specifically, in step S2, a target communication device is screened out from the communication devices currently undergoing WPS according to the device information.

Exemplarily, the dual-frequency client screens out a communication device currently undergoing WPS and having the same WPS type (e.g. PBC, PIN) as the dual-frequency client, respectively in 2.4G and 5G frequency bands according to the WPS information in WSC_IE of the scanned communication devices, as the target communication device, and initiates EAP message interaction with the target communication device. Under normal circumstances, the target communication devices that are screened out on the two frequency bands are a same communication device.

Specifically, in step S3, after the dual-frequency client completes the WPS process with the target communication device on the current frequency band, the WPS process interaction state of the dual-frequency client on the other frequency band is queried.

Exemplarily, the WPS process interaction state includes a scan stage, an authentication and association stage, and an EAP message interaction stage. The scan stage indicates that the dual-frequency client is in a stage of scanning communication devices on the current frequency band; the authentication and association stage indicates that the dual-frequency client is authenticating and associating with the communication device on the current frequency band; and the EAP message interaction stage indicates that the multi-frequency bridge client already screens out and successfully authenticates the communication device on the current frequency band, and is ready to perform message interaction with the communication device.

Specifically, in step S4, since the numbers of channels of different frequency bands are different, and durations required for scanning are different, the WPS process on each frequency band may not be synchronized. Therefore, for example, even if the WPS process on the other frequency band is in the scan stage when the WPS process on the current frequency band with the communication device is completed (such situation may be caused by a slower process), it may switch to a subsequent stage after a period of time. Therefore, a time delay of two portions may be introduced for the scan stage to determine whether the WPS process may be successfully completed.

Therefore, the step of setting a time delay according to the WPS process interaction state in step S4 includes step S41 to step S43:

In step S41, the time delay is set to a first preset time period, when the WPS process interaction state is in the scan stage;

In step S42: the time delay is set to a second preset time period, when the WPS process interaction state is in the EAP message interaction stage;

In step S43, the time delay is set to a third preset time period, when the WPS process interaction state is in the authentication and association stage;

The first preset time period is less than the second preset time period, and the second preset time period is less than the third preset time period.

Exemplarily, the first preset time period is 5 seconds, the second preset time period is 10 seconds, and the third preset time period is 15 seconds. When the WPS process interaction state is in the EAP message interaction stage, the time delay of 10 seconds, which is sufficient to complete all EAP message interaction. When the WPS process interaction state is in the authentication and association stage, the time delay is 15 seconds. When the WPS process interaction state is in the scan stage, the time delay is 5 seconds. Further, when it is determined in step S4 that the WPS process interaction state on the other frequency band is in the scan stage, the method further includes step S44 to step S47.

In step S44, the first preset time period for ending the scanning is waited, and the WPS process interaction state is reacquired;

In step S45, the time delay is additionally set to 0, in response to the reacquired WPS process interaction state being in the scan stage;

In step S46, the time delay is additionally set to the second preset time period, in response to the reacquired WPS process interaction state being in the EAP message interaction stage;

In step S47, the time delay is additionally set to the third preset time period, in response to the reacquired WPS process interaction state being in the authentication and association stage.

Exemplarily, after waiting for 5 seconds for ending the scanning, the WPS process interaction state is reacquired. In response to the reacquired WPS process interaction state still being in the scan stage, the time delay is set to 0, and the WPS process on the other frequency band is immediately terminated. In response to the reacquired WPS process interaction state being in other stages, the time delay is set according to step S46 to step S47 as described above, and then wait for the time delay to end.

Specifically, in step S5, the bridge type of the target communication device is determined according to the WPS process interaction state of the dual-frequency client on the other frequency band at the end of the time delay, and different configuration information acquisition methods are used according to the bridge type to acquire configuration information, for bridging the dual-frequency client with the target communication device on both frequency bands. The target communication device includes two types: one is a dual-frequency WPS communication device, which may simultaneously operate on both the 2.4G frequency band and the 5G frequency band and complete the WPS processes on both the 2.4G frequency band and the 5G frequency band; the other is a single-frequency WPS communication device, which may operate on both the 2.4G frequency band and the 5G frequency band, or only operate on one of the frequency bands, but may only complete the WPS process on one of the frequency bands.

Optionally, it is determined that the type of the target communication device is dual-frequency WPS communication device, in response to the WPS process of the dual-frequency client on the other frequency band having been completed by the end of the time delay. Therefore, the step of using different configuration information acquisition methods according to the bridge type to acquire configuration information, for bridging the dual-frequency client with the target communication device on the two frequency bands includes step S511.

In step S511, configuration information on the other frequency band is acquired from the dual-frequency WPS communication device, in response to the WPS process on the other frequency band having been completed within the time delay, and bridging with the dual-frequency WPS communication device on the two frequency bands is performed based on the configuration information on the two frequency bands.

Optionally, it is determined that the type of the target communication device is a single-frequency WPS communication device, in response to the WPS process of the dual-frequency client on the other frequency band having not been completed by the end of the time delay. Therefore, the step of using different configuration information acquisition methods according to the bridge type to acquire configuration information for bridging the dual-frequency client with the target communication device on the two frequency bands includes step S521 to step S523.

In step S521, the WPS process of the dual-frequency client on the other frequency band is terminated after the time delay ends;

In step S522, the configuration information of the current frequency band on which the WPS process succeeds is acquired from the target communication device, and SSID retrieval is performed according to the acquired configuration information and device information of all communication devices on each frequency band.

In step S523, configuration information of the dual-frequency client on the other frequency band is determined according to the retrieved SSID and the configuration information of the current frequency band on which the WPS process succeeds, and the configuration information on the two frequency bands is used to bridge with the single-frequency WPS communication device.

The configuration information on the frequency band may include SSID, key, encryption mode, etc.; and the device information may include SSID, UUID, and MAC address.

Exemplarily, SSID retrieval may be performed based on either SSIDs being the same, or UUIDs being the same and MAC addresses complying with a conversion rule.

For example, since the configuration information of the current frequency band is known based on completion of the WPS process, SSID included in the configuration information of the current frequency band may be determined, and with respect to the other frequency band, there may be a plurality of communication devices scanned. If there is an SSID in the device information of the plurality of communication devices that is the same as the known SSID, then the communication device corresponding to the SSID is the target communication device corresponding to the current frequency band, so the SSID on the other frequency band may be determined.

For another example, some contents in the messages sent by the target communication device on the 2.4G frequency band and the 5G frequency bands are correlated. MAC addresses in the messages sent by the same target communication device on two ports of the 2.4G frequency band and the 5G frequency band may be converted to each other through algorithms, and UUID thereof are the same. If message content of a target communication device on one frequency band (2.4G or 5G) is known, then a message of the same target communication device on the other frequency band may be filtered out, according to the MAC address and the UUID, as well as the principle of UUIDs being the same and MAC addresses complying with a conversion rule, so as to obtain the SSID of the target communication device on both frequency bands. Under normal circumstances, a user will set the two frequency bands of the target communication device to same encryption mode and key. When the dual-frequency client performs WPS with a single-frequency WPS communication device, configuration information of one frequency band may be acquired, and encryption mode and key are acquired by using WPS on both frequency bands. After acquiring the SSID of the target communication device on the other frequency band in other manner, there is a high probability of bridging the dual-frequency client to the target communication device on two frequency bands.

Exemplarily, after WPS on one frequency band succeeds, the dual-frequency client may acquire the configuration information (SSID, key, encryption mode) of the current frequency band pushed by the target communication device, and acquire pre-saved device information. Then, the dual-frequency client terminates the WPS process on the frequency band on which WPS does not succeed, takes SSID, UUID and MAC address in the device information as indexes, and follows a certain rule (SSIDs being the same, and UUIDs being the same and MAC addresses complying with a conversion rule), so that the dual-frequency client may acquire device information belonging to the same target communication device in the device information table for the frequency band on which WPS does not succeed, and acquire SSID of the target communication device on this frequency band, so as to bridge the dual-frequency client with the single-frequency WPS communication device on the other frequency band, according to the retrieved SSID.

Figure 2:
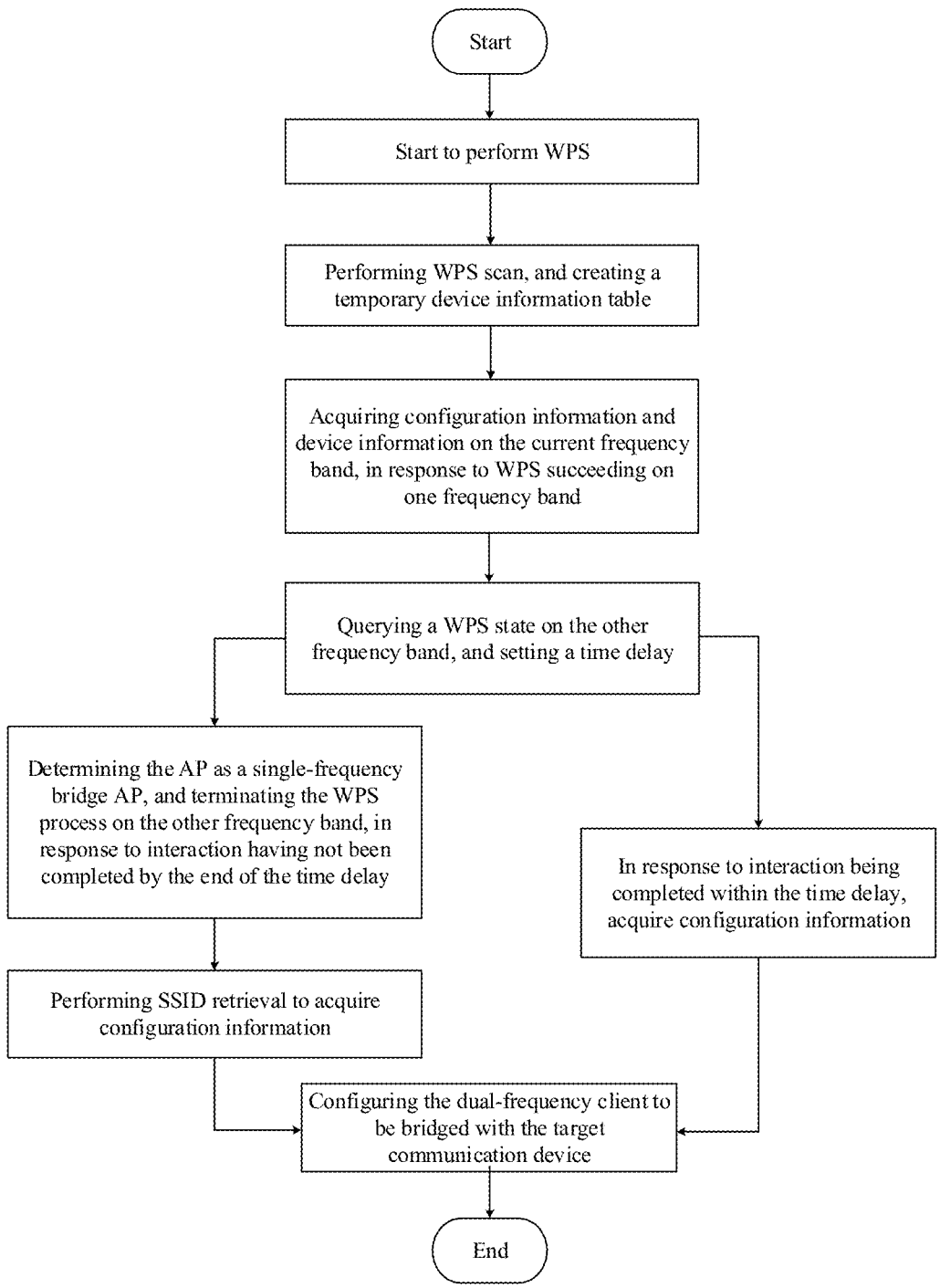
FIG. 2 is an example process diagram of the communication method of the client shown in FIG. 1 provided by the embodiment of the present disclosure.

Further, FIG. 2 may be referred to for the process of step S1 to step S5 as described above.

For example, when undergoing WPS, the multi-frequency bridge client will perform full channel active scan on all frequency bands, acquire nearby AP information, create a temporary device information table, and save information of all APs. The multi-frequency bridge client screens out APs currently undergoing WPS and having the same WPS type (e.g., PBC based or PIN based) as the client on one frequency band for WPS protocol interaction; and the frequency band serves as a first frequency band. After completing WPS protocol interaction, the multi-frequency bridge client may acquire configuration information (SSID, key, encryption mode) of the current frequency band pushed by the AP, as well as saved AP device information, then query the WPS process interaction state on the other frequency band and set different time delays. In response to the WPS process interaction on the other frequency band having not been completed by the end of the time delay, then the multi-frequency bridge client determines the AP as a single-frequency bridge AP, terminates the WPS process on the other frequency band, and acquires SSID of the AP on the other frequency band according to the above-described SSID retrieval method. The multi-frequency bridge client directly uses the acquired configuration information for bridging with the AP on the frequency band on which WPS process interaction is completed. On the other frequency band, the multi-frequency bridge client uses encryption mode and key in the acquired configuration information on the frequency band, as well as SSID included in the configuration information on the other frequency band, for bridging with the AP, so as to implement bridge with the AP on all frequency bands. In response to the WPS process on the other frequency band having been completed by the end of the time delay, the multi-frequency bridge client directly acquires configuration information on the other frequency band, for bridging with the AP.

In the embodiment of the present disclosure, when the communication device is a single-frequency WPS communication device, the dual-frequency client may be bridged with the single-frequency WPS communication device on two frequency bands after a user pressing the WPS button once, and through WPS and SSID retrieval by the client, resulting in short bridge time. When the communication device is a dual-frequency WPS communication device, the dual-frequency client may be bridged with the dual-frequency WPS communication device on two frequency bands after a user pressing the WPS button once, resulting in short bridge time.

As compared with the prior art, in the communication method of the dual-frequency client disclosed by the embodiment of the present disclosure, the device information of the communication devices currently undergoing WPS may be scanned by activating a mode of full channel scan, so that one target communication device is screened out from the communication devices currently undergoing WPS according to the device information, which allows the dual-frequency client to be successfully bridged with the target communication device on the current frequency band. Then, according to the interaction state of the other frequency band at the end of the time delay, the dual-frequency client is bridged with the target communication device on the other frequency band, without the user pressing the WPS button in the dual-frequency client again during the process, so that the dual-frequency client may be bridged to two frequency bands of the target communication device through the user pressing the WPS button only once. The communication method of the dual-frequency client disclosed by the embodiment of the present disclosure follows the WPS protocol and implements fast bridge with the communication device having single-frequency/dual-frequency WPS functions on two frequency bands through the user pressing the WPS button of the dual-frequency client once.

Although it is illustrated in the above text by taking two frequency bands as an example, those skilled in the art may understand that the client and the AP may be bridged on a plurality of frequency bands, rather than being limited to two frequency bands. In addition, the above text is described by taking the WPS process as a protocol interaction process, but the protocol interaction process may be of other types. For example, in the Wi-Fi easy connect technology, there will also be a protocol interaction process associated with the AP performed between the client and a network configurator. The present application is not limited to WPS interaction.

Figure 3:
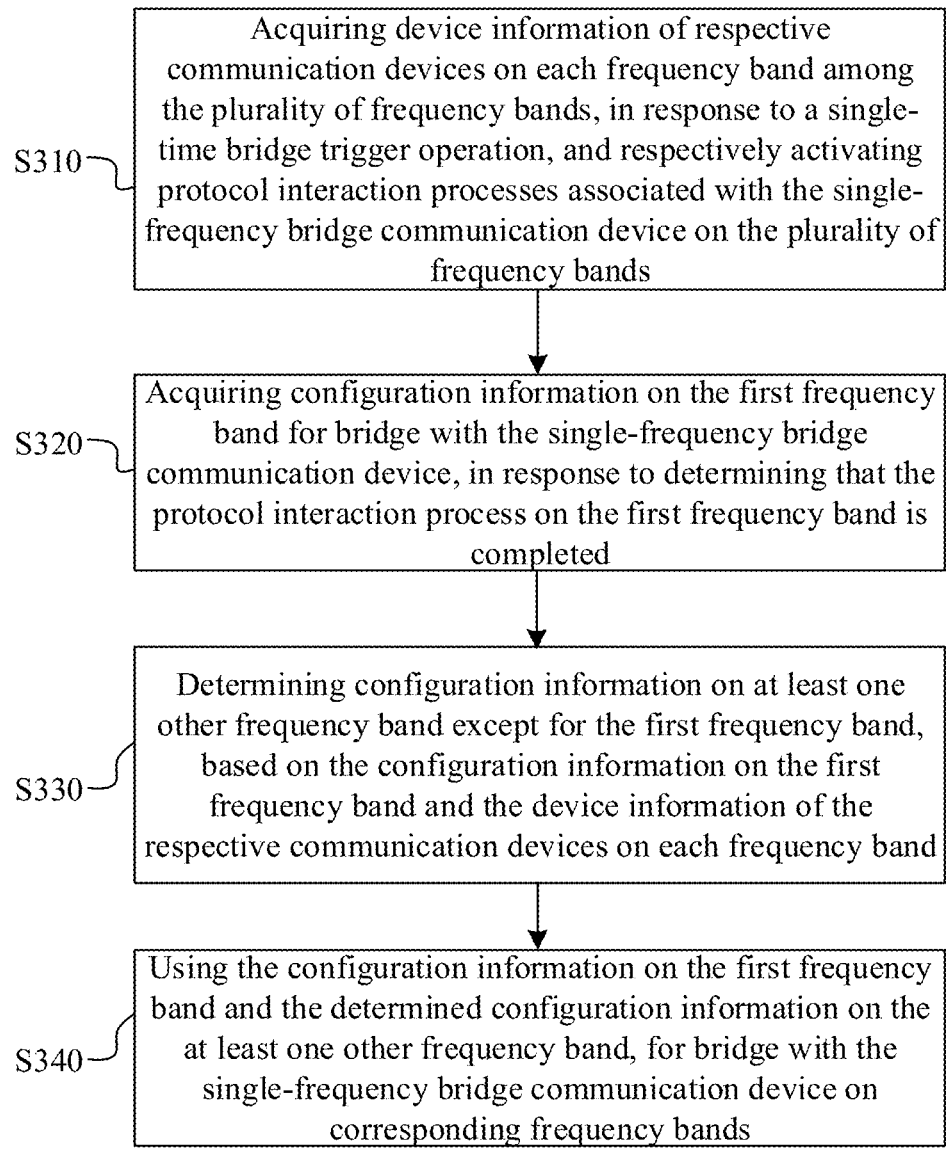
FIG. 3 is a flowchart of a communication method of a client provided by an embodiment of the present disclosure.

Referring to FIG. 3, FIG. 3 is a flowchart of a communication method of a client provided by an embodiment of the present disclosure. The client is used for bridging with a single-frequency bridge communication device on a plurality of frequency bands (2.4G, 5G, 6G, as well as subsequent frequency bands that may be supported by Wi-Fi). Exemplarily, the client may be a mobile phone, a computer, a relay (RE), etc.; and the communication device may be a wireless access point (AP). The communication method may include steps below.

In step S310, device information of respective communication devices on each frequency band among a plurality of frequency bands is acquired, in response to a single-time bridge trigger operation, and protocol interaction processes associated with the single-frequency bridge communication device are activated on the plurality of frequency bands, respectively.

Optionally, the bridge trigger operation may be any operation that may trigger association between the client and the communication device AP, for example, operations such as pressing a button, touching a button, entering a PIN code, NFC, and scanning a QR code, etc. related to activation of the protocol interaction process. For example, trigger operations related to wireless protection settings (WPS) technology may include trigger operations supported by the WSC standard protocol such as pressing a WPS button, touching a WPS button, entering a PIN code, NFC, etc.; the process associated with the Wi-Fi easy connect technology may include a trigger operation of acquiring identification information (e.g., scanning a QR code) of the client.

For example, when triggering association between a client and a communication device AP, in response to a single-time bridge trigger operation, the client may select a communication device to be bridged with from communication devices that announce to be capable of performing the protocol interaction process, for example, based on rules such as Device Password ID value being equal and Selected Registrar value being 1 in the WSC_IE field, and communication devices selected for each frequency band are usually a same communication device; or, the network configurator may scan the QR code of the client, to implement association between the communication device managed by the network configurator and the client. In this embodiment, the communication device associated with the client is a single-frequency bridge communication device, and the client may activate protocol interaction processes associated with the single-frequency bridge communication device on the plurality of frequency bands. The network configurator may be a trusted device used by an owner of a Wi-Fi easy connect network, for example, a smartphone, to permit and manage network access of other clients. The trusted device may be any trusted device within the Wi-Fi network.

In the context of the present application, the protocol interaction process may be a process for simplifying or managing network access of the client of a user based on interaction of protocol messages, for example, the protocol interaction process may include processes related to WPS technology and Wi-Fi easy connect technology. Based on a protocol interaction process completed on a certain frequency band, a configuration information provider may provide the client with configuration information on the frequency band, that is, if the protocol interaction process is completed on a certain frequency band, then the client may acquire configuration information on the frequency band for bridge with a communication device on the frequency band.

For example, with respect to the WPS technology, the client may activate full channel scan in response to a single-time bridge trigger operation, select a communication device (AP) for bridge communication, and thus activate protocol interaction processes with the communication device on the plurality of frequency bands. For example, with respect to the Wi-Fi easy connect technology, the client establishes a connection with the network configurator (managing the communication device to be bridged) (e.g., through scanning the QR code of the client by the network configurator), in response to a single-time bridge trigger operation, so as to activate protocol interaction processes with the network configurator on the plurality of frequency bands. After a protocol interaction process having been completed on each frequency band, the client may acquire configuration information for bridge with the communication device on the frequency band, so the protocol interaction process may be considered associated with the communication device.

For example, when acquiring the device information, the client may activate full channel scan in response to a single-time bridge trigger operation, so as to acquire the device information of all communication devices scanned for each frequency band among the plurality of frequency bands. Of course, it may also be the case that only some of the scanned communication devices are acquired, for example, communication devices that are clearly cannot be the single-frequency bridge communication device to be bridged may be screened out in advance, for example, by presetting a screening rule, for example, based on product information, etc.

Specifically, the client may activate full channel scan on all frequency bands, create a temporary device information table for each frequency band, and save device information of all APs scanned; that is, for each frequency band, a plurality of APs may be scanned, so that the temporary device information table may save device information of all APs for each frequency band.

Optionally, device information corresponding to each communication device (AP) is various types of information used to define attributes of the device per se, which, for example, may include service set identifier (SSID), universally unique identifier (UUID), and MAC address, etc. of the AP.

In addition, configuration information on each frequency band is information directly used to configure a bridge process, which may include, for example, SSID, encryption mode and key; and encryption mode and key on all frequency bands are the same.

In step S320, configuration information on the first frequency band for bridging with the single-frequency bridge communication device is acquired, in response to determining that the protocol interaction process on the first frequency band is completed.

Optionally, the client may complete the protocol interaction process with the network configurator managing the single-frequency bridge communication device or the single-frequency bridge communication device on the first frequency band, to acquire the configuration information on the first frequency band.

For example, the client may complete the protocol interaction process with the single-frequency bridge communication device on the first frequency band, and acquire the configuration information on the first frequency band from the single-frequency bridge communication device. The client further acquires device information of communication devices on respective frequency bands in step S310, and then obtains configuration information on other frequency bands through step S330 below.

For example, a communication device (the single-frequency bridge AP) may send interaction related information carrying an instruction on whether protocol interaction may be performed, device information, protocol interaction type, etc. to the client on a plurality of frequency bands. The client selects the same communication device (here the single-frequency bridge communication device) on the respective frequency bands based on the interaction related information, and completes the protocol interaction process with the communication device on the first frequency band, to acquire the configuration information on the first frequency band from the communication device.

Specifically, for example, after activating the WPS process, the communication device sends messages containing WPS related information to the multi-frequency bridge client on a plurality of frequency bands (taking two frequency bands as an example) simultaneously, to notify the multi-frequency bridge client that it has activated WPS. Exemplarily, after starting WPS, the communication device sends a beacon and a probe response carrying WSC_IE on two frequency bands simultaneously, which also includes device information of the communication device, to notify the multi-frequency bridge client that it has activated WPS (which also includes device information of the communication device). It is noted that WSC_IE is a WPS field that contains WPS information, where, the Device Password ID value represents a type of WPS (PBC, PIN), and the Selected Registrar value of 1 represents the communication device activating WPS. The multi-frequency bridge client screens the communication device that activates WPS through the information. The beacon is an active broadcast notification, and probe response is a response to probe request sent by the multi-frequency bridge client. For example, after activation, the client may scan and create two temporary device information tables, respectively for saving device information of APs on the two frequency bands, and meanwhile, the client screens out an AP (here the single-frequency bridge AP) currently undergoing WPS and having the same WPS type as the RE, in 2.4G or 5G according to the WPS information in WSC_IE of the scanned AP, and initiate EAP message interaction with the AP, but finally may complete the WPS process only on one frequency band (the first frequency band).

In addition, in a case where the AP is managed by the network configurator, the client performs the protocol interaction process with the network configurator, acquires, from the network configurator, configuration information on the first frequency band, and device information of communication devices on the respective frequency bands, and then obtains configuration information on other frequency bands through step S330 below. It should be noted that in such case, the acquiring device information in step S310 and the acquiring configuration information on the first frequency band in step S320 may be executed in any order or simultaneously, which will not be limited in the present disclosure.

In step S330, configuration information on at least one other frequency band except for the first frequency band is determined, based on the configuration information on the first frequency band and the device information of the respective communication devices on each frequency band among the plurality of frequency bands.

In order to facilitate to be differentiated from the first frequency band on which the protocol interaction process is completed, in the context of the present application, other frequency bands except for the first frequency band may be collectively referred to as second frequency bands, that is, a second frequency band may refer to a frequency band of a different frequency except for the first frequency band.

For example, the client may determine encryption mode and key included in configuration information on at least one other frequency band (second frequency band) based on the configuration information on the first frequency band. This is because in a case of a single-frequency bridge AP, encryption mode and key in the configuration information may be the same on all frequency bands. Then, the client may determine the SSID included in the configuration information on the at least one other frequency band, based on the configuration information on the first frequency band and/or the device information of the respective communication devices on each frequency band. In this way, configuration information (SSID, encryption mode and key) used for bridge on at least a part of frequency bands (first frequency band and the at least one other frequency band) has been acquired.

It should be noted that it may be determined, according to frequency bands on which the client is to be bridged with the communication device under actual needs, whether configuration information of all of the other frequency bands except for the first frequency band (the frequency band on which the protocol interaction process is completed) is determined, or configuration information of only some of these frequency bands is determined, which will not be limited in the present application.

A specific process of using the device information to determine the SSID may have several example implementations below.

In a first implementation, considering that some users may set SSIDs included in configuration information on all frequency bands for a same single-frequency bridge communication device to be exactly the same, if the client may screen out (e.g., from the temporary device information table) device information having same SSID for other frequency bands, then it is considered that the communication devices corresponding to these SSIDs belong to a same one communication device.

That is, the process of determining the SSID may include: acquiring the SSID on the first frequency band based on the configuration information on the first frequency band; determining, for each second frequency band (each of other frequency bands corresponding to different frequencies) among the above-described at least one second frequency band, that a communication device whose device information includes the same SSID as the SSID on the first frequency band among the respective communication devices on the second frequency band is the same device as the single-frequency bridge communication device; and taking the SSID on the first frequency band as the SSID in the configuration information on the second frequency band.

In a second implementation, considering that device information sent by a same single-frequency bridge communication device on all frequency bands has certain correlation, for example, MAC addresses in messages sent by a same single-frequency bridge communication device on all frequency bands may meet a certain mapping rule and UUIDs are the same, if the device information of the single-frequency bridge communication device on the first frequency band is known, then according to the known MAC address and the known UUID in the known device information, for other frequency bands, the client may screen out (e.g., from the temporary device information table) device information whose MAC address and the known MAC address meet the mapping rule and UUID is the same as the known UUID, based on the principles of UUIDs being the same and MAC addresses complying with the mapping rule, and the client may assume the communication devices corresponding to these MAC addresses to belong to the same communication device.

That is, the process of determining the SSID may include: determining a first MAC address and a first UUID of the single-frequency bridge communication device on the first frequency band based on the device information of the single-frequency bridge communication device on the first frequency band; determining a second MAC address and a second UUID of each communication device on each second frequency band among the above-described at least one second frequency band, based on the device information of respective communication devices on each second frequency band; determining that the communication device whose second MAC address meets the mapping rule with the first MAC address and whose second UUID is the same as the first UUID among the respective communication devices on the second frequency band is the same device as the single-frequency bridge communication device, and taking the SSID in the device information of the determined communication device as the SSID in the configuration information on the second frequency band.

Optionally, in order to acquire the device information of the single-frequency bridge communication device on the first frequency band, in a case where the client performs protocol interaction process with the single-frequency bridge communication device, the device information of the single-frequency bridge communication device has been already acquired from the single-frequency bridge communication device in the process that the client screens out the single-frequency bridge communication device to be bridged on the first frequency band.

In addition, in the case where the client performs protocol interaction process with the network configurator, the configuration information on the first frequency band acquired by the client from the network configurator may include the SSID, and for example, the device information of the respective communication devices (including the single-frequency bridge communication device to be bridged) on the first frequency band obtained based on full channel scan also respectively includes the SSID, so, the client may screen out the device information on the first frequency band of the single-frequency bridge communication device to be bridged based on the acquired configuration information on the first frequency band.

In a third implementation, considering that the same single-frequency bridge communication device will announce product information thereof (e.g., manufacturer, AP model, product code, etc.) in the interaction message when it interacts with the client, if the device information of the communication device on the first frequency band is known, then the client may filter out, for other frequency bands, device information (e.g., from the temporary device information table) having the same product information according to the product information (manufacturer, AP model, product code, etc.) included in the known device information, and assume that communication devices corresponding to the product information belong to the same communication device Similar to the second implementation, the process of determining the SSID may include: determining first product information of the single-frequency bridge communication device based on the device information of the single-frequency bridge communication device on the first frequency band; determining, based on the device information of respective communication devices on each second frequency band among the above-described at least one second frequency bands, second product information of each communication device on the second frequency band; for each second frequency band among the above-described at least one second frequency bands, determining that the communication device whose second product information is the same as the first product information among respective communication devices on the second frequency band is the same device as the single-frequency bridge communication device, and taking the SSID in the device information of the determined communication device as the SSID in the configuration information on the second frequency band.

In a fourth implementation, it is considered that some users will set SSIDs included in configuration information on all frequency bands of a same single-frequency bridge communication device to a same format, for example, using a fixed string plus different suffixes or different prefixes plus fixed strings. If the SSIDs contained in the device information and filtered out by the client (e.g., from the temporary device information table) have a continuous and identical string with the SSID of the single-frequency bridge communication device on the first frequency band, it is assumed that these SSIDs are related to a same communication device.

That is, the process of determining the SSID may include: determining a first SSID embedded with a predetermined format of the single-frequency bridge communication device based on the device information of the single-frequency bridge communication device on the first frequency band; determining, based on the device information of respective communication devices on each second frequency band among the above-described at least one second frequency band, a second SSID embedded with the predetermined format of each communication device on each second frequency band; for each second frequency band among the above-described at least one second frequency band, determining that the communication device whose second SSID meets an association relationship with the first SSID among the respective communication devices on the second frequency band is the same device as the single-frequency bridge communication device, and taking the second SSID in the device information of the determined communication device as the SSID in the configuration information on the second frequency band.

For ease of description, the above-described method for determining the SSID is referred to as a SSID-based retrieval method.

Optionally, if no corresponding SSID is retrieved on some second frequency bands, bridge will not be performed on these frequency bands.

Returning to FIG. 3, in step S340, the configuration information on the first frequency band and the determined configuration information on the at least one other frequency band are used for bridging with the single-frequency bridge communication device on the first frequency band and the at least one other frequency band.

That is to say, in step S340, configuration information (SSID, encryption mode and key) for bridge on at least a part of frequency bands (the first frequency band and the above-described at least one other frequency band) is already acquired, so that the client may use these pieces of configuration information for bridging with the single-frequency bridge communication device on the corresponding frequency bands among the plurality of frequency bands.

Figure 4A:
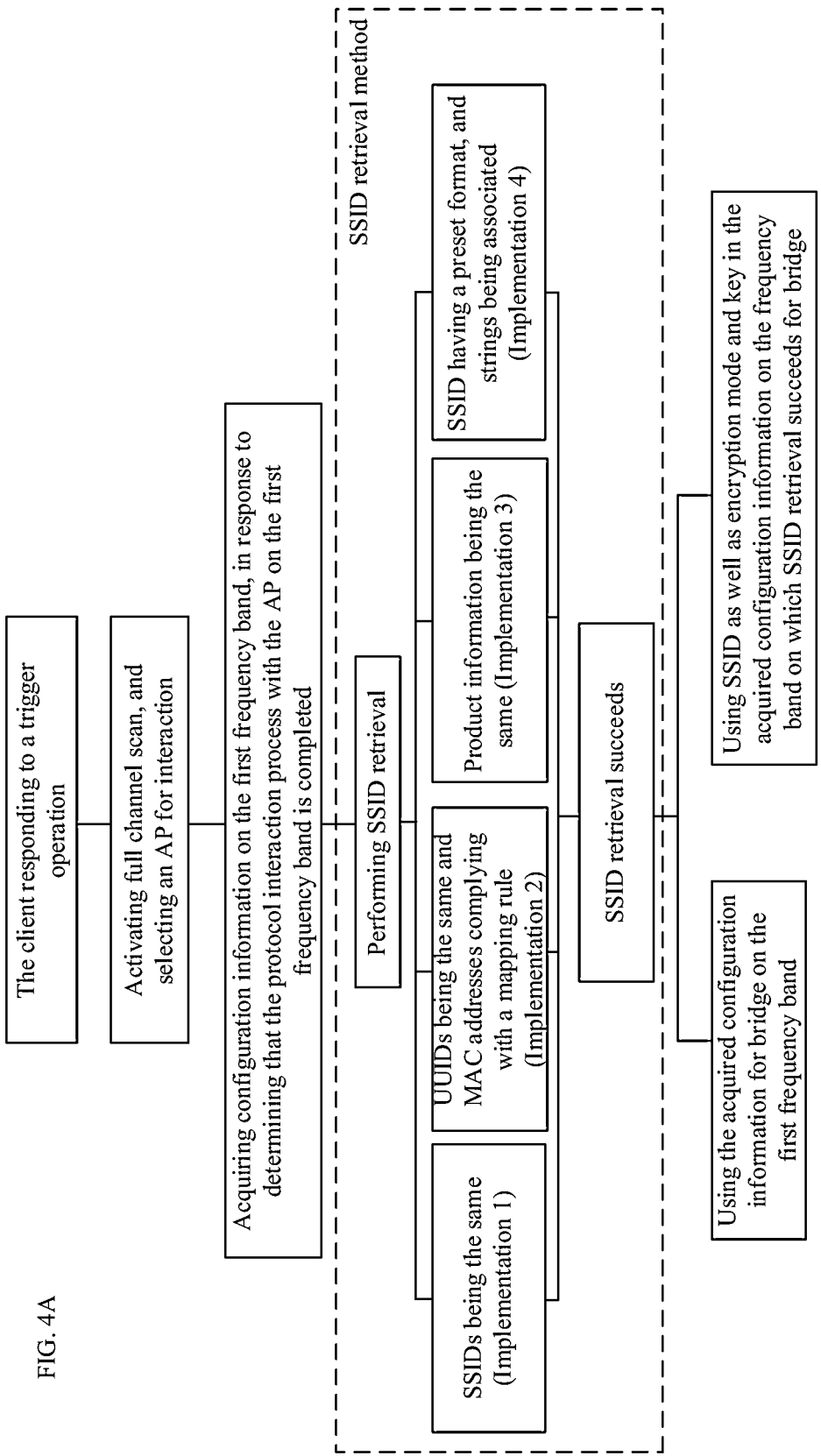
FIG. 4A to FIG. 4B are example process diagrams of the communication method of the client shown in FIG. 3 provided by the embodiment of the present disclosure.
Figure 4B:
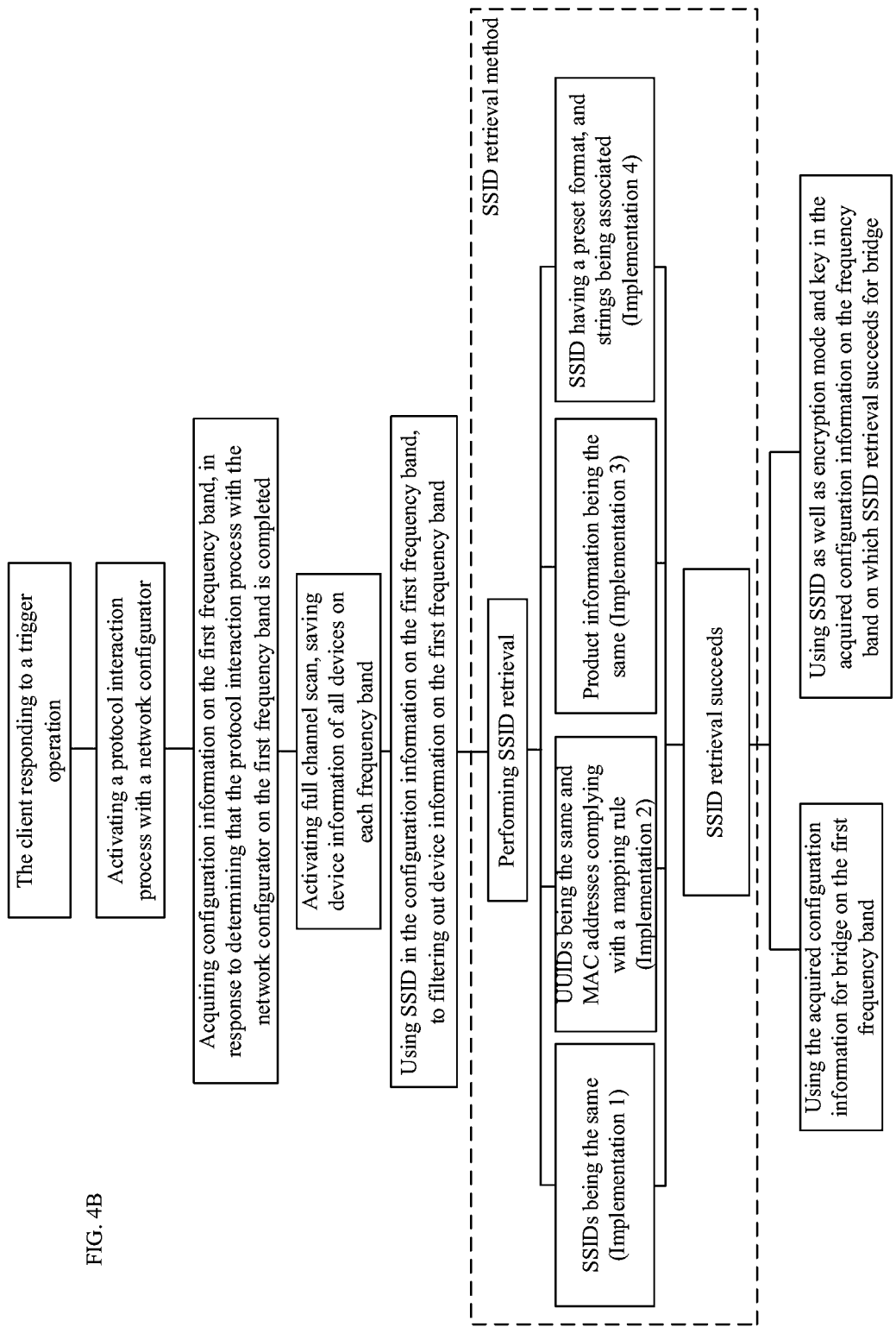

FIG. 4A to FIG. 4B show two instances of the communication method shown in FIG. 3, corresponding to the WPS technology and the Wi-Fi easy connect technology, respectively.

In FIG. 4A, after triggering association between the multi-frequency bridge client and the single-frequency bridge communication device (AP) in the WPS manner, the AP simultaneously announces currently undergoing WPS on all frequency bands, but finally may complete interaction of the WPS protocol message on only one frequency band (the first frequency band). When undergoing WPS, the multi-frequency bridge client will perform full channel active scan on all frequency bands, acquire nearby AP information, create a temporary device information table, and save information of all APs; the multi-frequency bridge client screens out an AP currently undergoing WPS and having the same WPS type (e.g., PBC based or PIN based) as the client on one frequency band for WPS protocol interaction, and the frequency band serves as the first frequency band. After completing WPS protocol interaction, the multi-frequency bridge client may acquire configuration information (SSID, key, encryption mode) of the current frequency band pushed by the AP, as well as the saved AP device information, and then use the acquired configuration information and the device information to acquire SSIDs of the AP on other frequency bands, according to the SSID retrieval method as described above. On the first frequency band on which protocol interaction is completed, the multi-frequency bridge client directly uses the acquired configuration information for bridging with the AP. On the second frequency band except for the first frequency band, the multi-frequency bridge client uses encryption mode and key in the acquired configuration information on the first frequency band, as well as an SSID included in the configuration information of each second frequency band, for bridging with the AP, thereby implementing bridge with the AP on all frequency bands.

In FIG. 4B, after triggering association between the multi-frequency bridge client and the single-frequency bridge communication device (AP) in a Wi-Fi easy connect manner, the multi-frequency bridge client performs device provisioning protocol (DPP) interaction with the network configurator of the AP. After interaction is completed, the network configurator sends configuration information (SSID, key, encryption mode) of one frequency band (the first frequency band) of the AP to the multi-frequency bridge client. After acquiring the configuration information, the multi-frequency bridge client activates full channel scan of all frequency bands and creates a temporary device information table for respective frequency bands, and saves device information of all the scanned APs. After scan is completed, the client may use the acquired configuration information and the saved device information to acquire the SSID of the AP on other frequency bands according to the above-described SSID retrieval method. On the first frequency band on which the configuration information is acquired, the multi-frequency bridge client directly uses the acquired configuration information for bridging with the AP. On the second frequency band except for the first frequency band, the multi-frequency bridge client uses encryption mode and key in the acquired configuration information on the first frequency band, as well as the SSID included in the configuration information of each second frequency band, for bridging with the AP, thereby implementing bridge with the AP on all frequency bands.

By using the communication method of the client as described with reference to FIG. 3 to FIG. 4B, in a case of bridging with a single-frequency bridge communication device to implement communication, after acquiring configuration information of one frequency band, configuration information on at least one other frequency band may be obtained based on the SSID retrieval method according to the configuration information and the saved device information, in order to quickly use these pieces of configuration information to implement bridge with the communication device on a plurality of frequency bands, without waiting for a longer time (e.g., two minutes) specified in the protocol. Therefore, bridge time may be shortened.

In the embodiments as described above with reference to FIG. 3 to FIG. 4B, the SSID retrieval method is used to obtain SSIDs of other frequency bands, which in conjunction with encryption mode and key on the first frequency band, may be used to obtain configuration information on other frequency bands. This process is based on a case where encryption mode and key in the configuration information is the same for all frequency bands.

However, in other scenarios, the multi-frequency bridge client may be incapable of knowing the type of the AP to be bridged (single-frequency bridge or multi-frequency bridge), and when the multi-frequency bridge client performs bridge association with the multi-frequency bridge AP, encryption mode and key in the configuration information for the multi-frequency bridge AP may be different for all frequency bands, so configuration information on other frequency bands cannot be obtained through a single-time bridge trigger operation by using the above-described SSID retrieval method.

In addition, when the multi-frequency bridge client bridges with a single-frequency bridge AP, the protocol interaction process will be performed on only one frequency band, and when the multi-frequency bridge client bridges with a multi-frequency bridge AP, the protocol interaction process will be performed on a plurality of frequency bands, so according to another aspect of the present application, configuration information on different frequency bands may be acquired in different manners based on a stage of the protocol interaction process on each frequency band, so as to implement the bridge with the AP.

Figure 5:
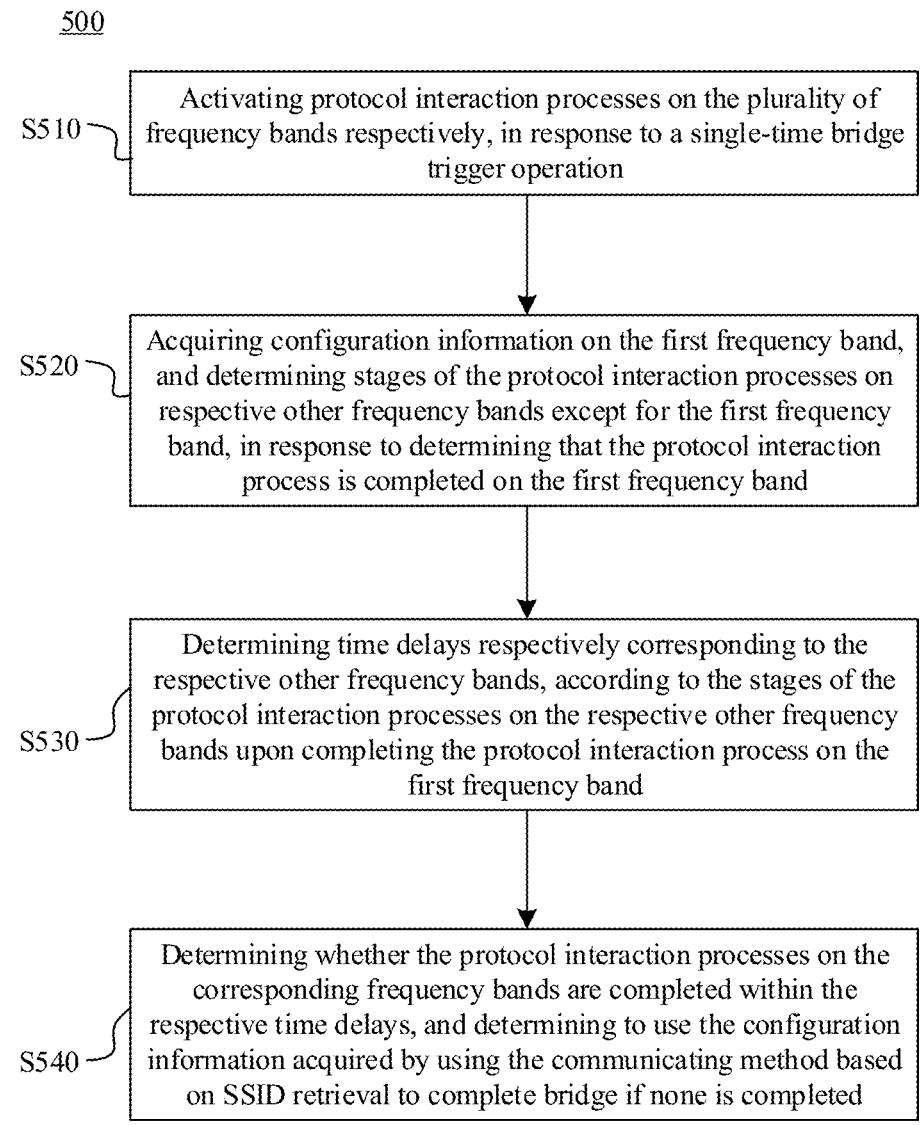
FIG. 5 is a flowchart of another communication method of a client provided by an embodiment of the present disclosure.

FIG. 5 shows a flowchart of another communication method of a client according to an embodiment of the present application. The client is used for bridging with a communication device on a plurality of frequency bands (2.4G, 5G, 6G, as well as subsequent frequency bands that may be supported by Wi-Fi). Exemplarily, the client may be a mobile phone, a computer, a relay (RE), etc., and the communication device may be a wireless access point (AP). The communication method may include steps below.

As shown in FIG. 5, in step S510, protocol interaction processes on the plurality of frequency bands are activated, respectively, in response to a single-time bridge trigger operation.

Optionally, respective examples of the bridge trigger operation are similar to those described above with reference to FIG. 1.

For example, with respect to the WPS technology, the client may activate full channel scan in response to a single-time bridge trigger operation, select a communication device (AP) for bridge communication, such that protocol interaction processes with the communication device are activated on the plurality of frequency bands. For example, with respect to the Wi-Fi easy connect technology, the client establishes a connection with the network configurator (managing the communication device to be bridged) (e.g., through scanning the QR code of the client by the network configurator), in response to a single-time bridge trigger operation, so as to activate protocol interaction processes with the network configurator on the plurality of frequency bands.

In step S520, configuration information on the first frequency band is acquired, and a stage of the protocol interaction process on each of other frequency bands except for the first frequency band is determined, in response to determining that the protocol interaction process is completed on the first frequency band.

For each frequency band, the client may acquire configuration information on the corresponding frequency band when the protocol interaction process on the frequency band is completed.

Exemplarily, with respect to the WPS technology, the stages of the protocol interaction process include a scan stage, an authentication and association stage, and a message interaction stage. The scan stage indicates that the multi-frequency bridge client is in a stage of scanning communication devices on the current frequency band; the authentication and association stage indicates that the multi-frequency bridge client is authenticating and associating with the communication device on the current frequency band; and the message interaction stage indicates that the multi-frequency bridge client already screens out and successfully authenticates the communication device on the current frequency band, and is ready to perform message interaction with the communication device.

With respect to the Wi-Fi easy connect technology, the protocol interaction process is divided into a bootstrap stage, a verification stage, a configuration stage, and a network access stage. The bootstrap stage refers to that the client will include information thereof in the QR code, and the network configurator scans the QR code to establish a mutual trust relationship with the client, allowing for a next stage of the protocol interaction process; the verification stage refers to that the network configurator and the client perform interaction of the protocol message, establishing a secure Wi-Fi connection; the configuration stage refers to that the network configurator pushes configuration information to the client; and the network access stage refers to that the client uses the configuration information for bridging with the communication device.

In addition, after the client completes the protocol interaction process with the communication device on the first frequency band, the communication device may provide the client with configuration information on the first frequency band.

In step S530, time delays respectively corresponding to the respective other frequency bands are determined, according to the stages of the protocol interaction processes on the respective other frequency bands upon the completion of the protocol interaction process on the first frequency band.

Since the numbers of channels on different frequency bands are different and durations required for scanning are different, the protocol interaction processes on the respective frequency bands may not be synchronized. Therefore, for example, even if the protocol interaction process on the first frequency band with the communication device is completed, the protocol interaction process on a second frequency band is in the scan stage, and such situation may be caused by a slower process, that is, it may switch to a subsequent stage after a period of time for the second frequency band. Therefore, different time delays may be introduced to improve such situation.

In addition, there may be multiple other frequency bands, so a corresponding time delay may be set for each frequency band. In addition, a time delay is only determined for each of the other frequency bands when the protocol interaction process on the first frequency band is completed; and the time delay is no longer determined when the protocol interaction process on another frequency band is completed.

For example, when determining a corresponding time delay for each of the other frequency bands (each second frequency band), determination methods below may be included.

On one hand, in a case where the protocol interaction process (e.g., the WPS process) is performed between the client and the communication device, the protocol interaction process may be divided by time into a scan stage, an authentication and association stage, and a message interaction stage.

Therefore, the step of determining the time delay may include the following cases.

Case 1: in a case where the protocol interaction process on a second frequency band is in the scan stage, a first initial time delay having a first predetermined duration (e.g. 5 seconds) is determined, and a first additional time delay is determined, according to an update stage of the protocol interaction process on the second frequency band at the end of the first initial time delay, where, the first initial time delay and the first additional time delay serve as the time delay corresponding to the second frequency band.

Case 2: in a case where the protocol interaction process on the second frequency band is in the authentication and association stage, a second initial time delay having a second predetermined duration (e.g. 15 seconds) is determined as a time delay corresponding to the second frequency band.

Case 3: in a case where the protocol interaction process on the second frequency band is in the message interaction stage, a third initial time delay having a third predetermined duration (e.g., 10 seconds) is determined as a time delay corresponding to the second frequency band.

The first predetermined duration is less than the third predetermined duration; and the third predetermined duration is less than the second predetermined duration.

Optionally, when determining the first additional time delay, a duration thereof may be determined according to the update stage of the protocol interaction process on the second frequency band at the end of the first initial time delay. For example, in a case where the update stage at the end of the first initial time delay is the scan stage, the duration of the first additional time delay is determined as 0, in a case where the update stage at the end of the first initial time delay is the authentication and association stage, the first additional time delay is determined to have a second predetermined duration, and in a case where the update stage at the end of the first initial time delay is the message interaction stage, the first additional time delay is determined to have a third predetermined duration.

That is, in a case where the protocol interaction process on the current second frequency band is in a stage different from the scan stage when the protocol interaction process on the first frequency band is completed, it indicates that the communication device is capable of being scanned on the current second frequency band and may be capable of completing the protocol interaction process, so a certain time delay is set for waiting until the protocol interaction process is completed; in a case where the protocol interaction process on the current second frequency band is in the scan stage when the protocol interaction process on the first frequency band is completed, two judgment procedures are involved to determine whether it is caused by a slower process or it is indeed impossible to bridge with the communication device, therefore, a first initial time delay is set, the duration of the first initial time delay (e.g. 5 seconds) being determined according to empirical values and being greater than or equal to a minimum duration allowing for completing the scan stage; if it is still in the scan stage after the first initial time delay, it indicates that the communication device cannot be scanned on the current second frequency band, and thus is incapable of completing the protocol interaction process with the communication device, so, the first additional time delay with a value of 0 is set and the protocol interaction process on second frequency band is immediately ended; on the contrary, if it is in a stage different from the scan stage after the first initial time delay, it indicates that the communication device is capable of being scanned on the current second frequency band and may be capable of completing the protocol interaction process, so, a first additional time delay having a same duration as the second preset duration or the third preset duration is set to complete the protocol interaction process.

On the other hand, in a case where the protocol interaction process is performed between the client and the network configurator managing the communication device (e.g., the Wi-Fi easy connect process), the protocol interaction process may be divided by time into a bootstrap stage, a verification stage, a configuration stage, and a network access stage.

Therefore, the step of determining the time delay is similar to the above-described cases 1 to 3, except that the scan stage is replaced by the bootstrap stage, the authentication and association stage is replaced by the verification stage, and the message interaction stage is replaced by the configuration stage and the network access stage. Therefore, no details will be repeated here.

In step S540, for each frequency band among the respective other frequency bands, whether the protocol interaction process on the frequency band is completed within the time delay corresponding to the frequency band is determined; and the protocol interaction processes on the respective other frequency bands are terminated in a case where none of the protocol interaction processes is completed, and the communication method as described above with reference to FIG. 3 to FIG. 4B is used for bridging with the communication device.

For example, in a case where none of the protocol interaction processes on the respective other frequency bands is completed, the protocol interaction processes on the respective other frequency bands are terminated. Device information of respective communication devices on each frequency band among the plurality of frequency bands is acquired. Configuration information on at least one other frequency band except for the first frequency band is determined, based on the configuration information on the first frequency band and the device information of the respective communication devices on each frequency band, and the configuration information on the first frequency band and the determined configuration information on the at least one other frequency band are used for bridging with the communication device on the first frequency band and the at least one other frequency band.

For example, for each frequency band among the respective other frequency bands, in a case where the protocol interaction process on the frequency band is not completed within the time delay corresponding to the frequency band, which may be because the client fails to have the communication device scanned on the frequency band or the communication device rejects connections on other frequency bands after completing interaction with the communication device on the first frequency band, which leads to the failure in the authentication and association stage or the message interaction stage. If none of the protocol interaction processes on the other frequency bands is completed within the time delay thereof, it may be determined that the type of the communication device is single-frequency bridge, so, the protocol interaction processes on the other frequency bands may be terminated, the SSID-based retrieval method is used to obtain SSIDs on the other frequency bands, and then, configuration information on the other frequency bands may be obtained based on the SSIDs as well as the encryption mode and key included in the configuration information on the first frequency band, for quick bridge with the AP.

Optionally, the method may further include: in a case where a protocol interaction process on at least one frequency band among the respective other frequency bands is completed within a time delay corresponding to the at least one frequency band, acquiring configuration information on the at least one frequency band on which the protocol interaction process is completed, and using the configuration information on the respective frequency bands and the configuration information on the at least one frequency band on which the protocol interaction process has been completed, for bridging with the communication device on corresponding frequency bands. Optionally, with respect to other frequency bands from which configuration information cannot be acquired based on the protocol interaction process, the SSID-based retrieval method as described above may also be used, in a case where encryption mode and key are known to be the same in configuration information on each frequency band.

For example, the other frequency bands except for the first frequency band include four frequency bands. Protocol interaction processes on two frequency bands therein are already completed within the time delays respectively corresponding to the two frequency bands, then configuration information on the two frequency bands on which the protocol interaction processes are completed may be acquired, and the acquired configuration information may be used for bridging with the communication device on the two frequency bands on which the protocol interaction processes are completed. Protocol interaction processes on the remaining two frequency bands are not completed at the end of time delays respectively corresponding thereto, so configuration information on the remaining two frequency bands cannot be acquired. Optionally, the SSID-based retrieval method may also be used subsequently in a similar way to acquire the configuration information on the remaining two frequency bands.

That is, for each frequency band, as long as a protocol interaction process is completed within a corresponding time delay, configuration information on the frequency band may be acquired, without even waiting for the time delay to end; for each frequency band, if the protocol interaction process cannot be completed within a corresponding time delay, the SSID-based retrieval method may also optionally be used (in a case where encryption mode and key for all the frequency bands are the same) to acquire the configuration information.

Figure 6:
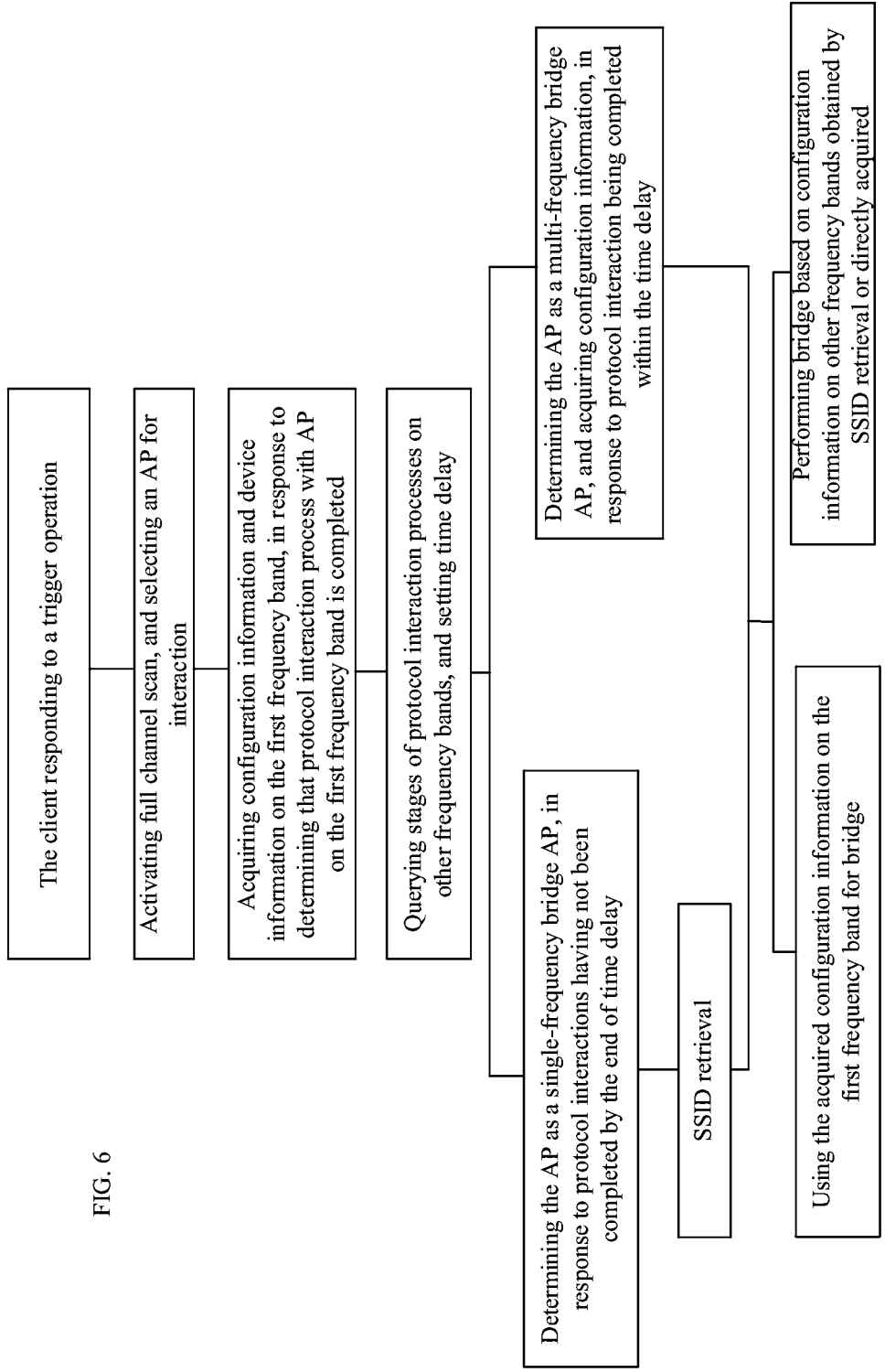
FIG. 6 to FIG. 7 are example process diagrams of the communication method of the client shown in FIG. 5 provided by the embodiment of the present disclosure.
Figure 7:
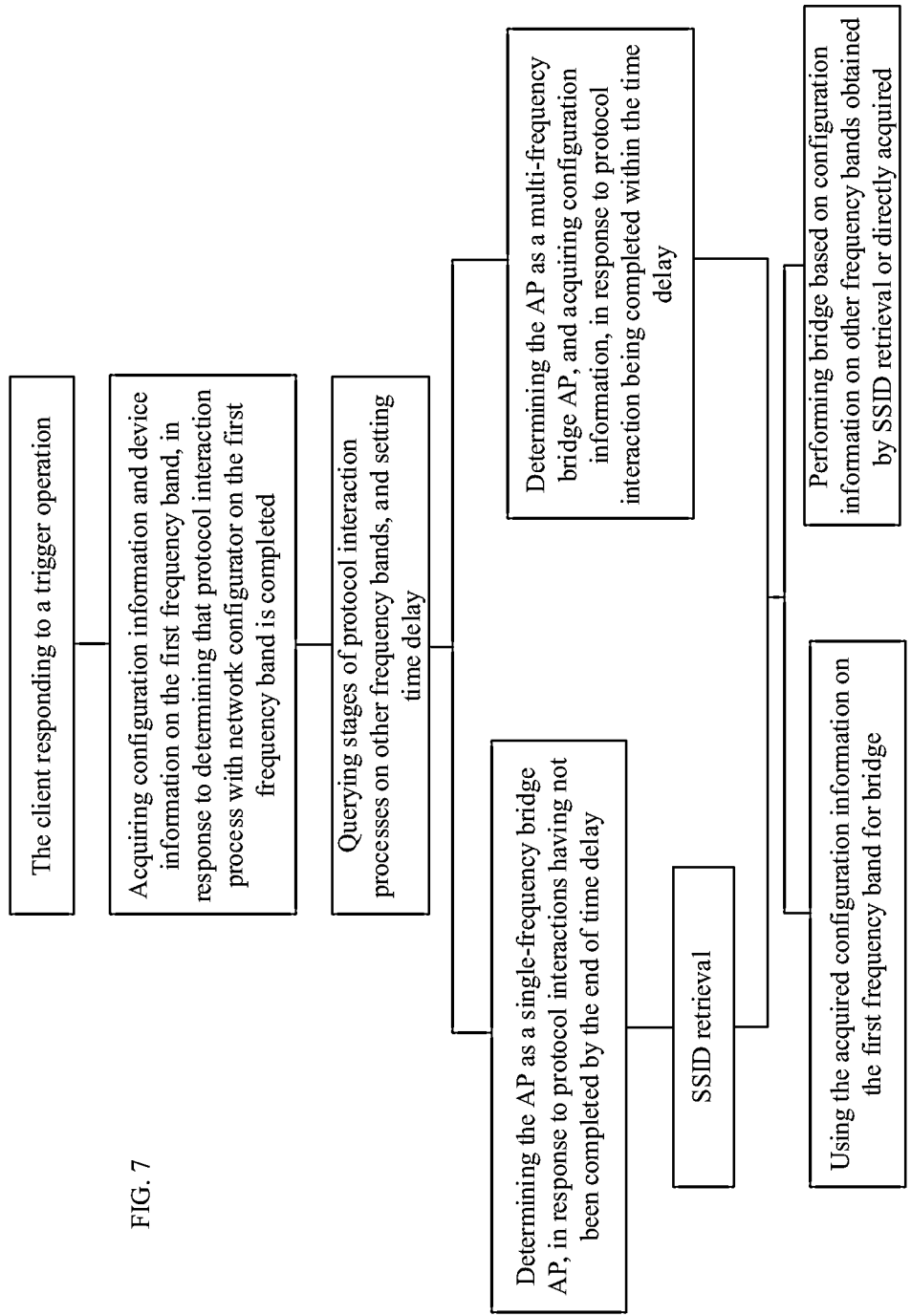

FIG. 6 to FIG. 7 each shows a schematic diagram of a specific process of the communication method according to FIG. 5.

As shown in FIG. 6, with respect to the WPS process, bridge association between the multi-frequency bridge client and the AP is triggered firstly, and the multi-frequency bridge client activates full channel scan to select the AP for interaction. The protocol interaction process of the multi-frequency bridge client on each frequency band may be divided into a scan stage, an authentication and association stage, and a message interaction stage. In order to allow the multi-frequency bridge client to be compatible with single-frequency bridge APs and multi-frequency bridge APs, the multi-frequency bridge client will not immediately stop protocol interaction processes on other frequency bands after completing wireless protocol interaction on one frequency band, but will query current stages of the protocol interaction processes on the other frequency bands. With respect to different stages, different time delays (time margins for determining the scan stage and time duration for completing the stage different from the scan stage of the protocol interaction process) are set. For example, if another frequency band is in the protocol message interaction stage, a time delay is set to 10 seconds (the foregoing third initial time delay of the third preset duration), which is sufficient to complete protocol message interaction. If the other frequency band is in the authentication and association stage, a time delay is set to 17 seconds (the foregoing second initial time delay of the second preset duration). If the other frequency band is in the scan stage, since the numbers of channels of different frequency bands are different, and durations required for scanning are different, the client may not have completed scanning yet, then the first initial time delay is set to 7 seconds (the foregoing first preset duration) to ensure that the client may complete scanning, and if the other frequency band is still in the scan stage after the 7 seconds, that is, the client is incapable of scanning the AP that meets the standard protocol on this frequency band, then the first additional time delay is set to 0 to immediately terminate the protocol interaction process on this frequency band, or if the other frequency band is in other stage different from the scan stage after the 7 seconds, the time delay is set as described above. If the protocol message interaction processes are not completed within time delays corresponding to the respective other frequency bands, or if no AP that meets the protocol is scanned on the respective other frequency bands, the AP is considered as a single-frequency bridge AP, the protocol interaction processes on the other frequency band are terminated, and the SSID-based retrieval method may be used to acquire SSIDs for the other frequency bands to obtain configuration information on the other frequency bands. If the AP is a multi-frequency bridge AP, the protocol interaction process may be completed within the time delay of the second preset duration or the third preset duration, thereby obtaining the configuration information.

For example, with respect to the Wi-Fi easy connect technology, the network configurator scans the QR code of the client (including information such as identification, model, etc. of the client), to establish a connection with the client, and performs device provisioning protocol (DPP) interaction on a plurality of frequency bands. The the protocol interaction process of the multi-frequency bridge client on each frequency band may be divided into a bootstrap stage, a verification stage, a configuration stage, and a network access stage. In order to allow the multi-frequency bridge client to be compatible with a single-frequency bridge AP and a multi-frequency bridge AP, the multi-frequency bridge client will not immediately stop protocol interaction processes on other frequency bands after completing wireless protocol interaction on one frequency band, but will query a current stage of the protocol interaction processes on the other frequency bands. With respect to different stages, different time delays are set. For example, when another frequency band is in the configuration or network access stage, a time delay is set to 10 seconds (the foregoing third initial time delay of the third preset duration), which is sufficient to complete protocol message interaction. If the other frequency band is in the verification stage, a time delay is set to 17 seconds (the foregoing second initial time delay of the second preset duration). If the other frequency band is in the bootstrap stage, the first initial time delay is set to 7 seconds (the foregoing first preset duration), and if after the 7 seconds, the other frequency band is still in the bootstrap stage, that is, the client is incapable of completing the protocol interaction process with the network configurator on this frequency band, then the first additional time delay is set to 0 to immediately terminate the protocol interaction process on this frequency band, or if the other frequency band is in other stage different from the bootstrap stage after the 7 seconds, the time delay is set as described above. If the protocol interaction processes are not completed within time delays corresponding to the respective frequency bands, the AP is considered as a single-frequency bridge AP, the protocol interaction processes on the other frequency bands are terminated, and the SSID-based retrieval method may be used to acquire SSIDs for the other frequency bands to obtain configuration information on the other frequency bands. If the AP is a multi-frequency bridge AP, the protocol interaction process may be completed within the time delay of the second preset duration or the third preset duration as described above, thereby obtaining the configuration information.

By using the communication method of the client as described with reference to FIG. 5 to FIG. 7, the bridge type of the AP may be determined based on the stage of the protocol interaction process on each second frequency band except for the first frequency band on which the protocol interaction process is completed, so as to determine whether to use the SSID-based retrieval method as described in FIG. 3 to FIG. 4B to acquire the configuration information or to wait for a preset time delay to acquire configuration information of the second frequency band, to complete bridge with the AP on all frequency bands, which, thus, may implement compatibility of the multi-frequency bridge client with a single-frequency bridge communication device and a multi-frequency bridge communication device.

In other embodiments, some private protocols may be developed over the standard protocol, allowing for information transfer between the client and the network configurator or the communication device based on the private protocols.

Figure 8:
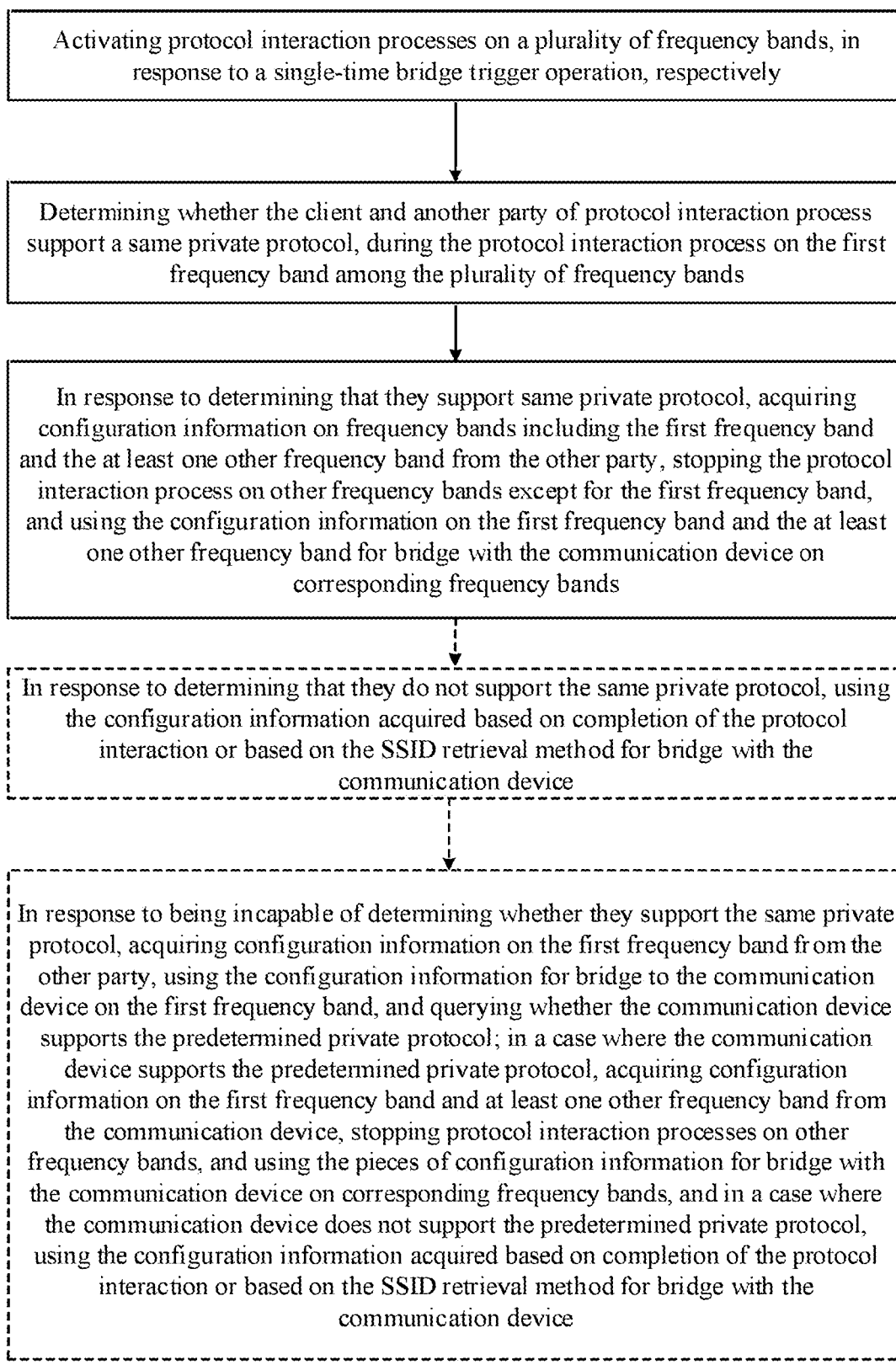
FIG. 8 is a flowchart of another communication method of a client provided by an embodiment of the present disclosure.

FIG. 8 shows a flowchart of another communication method of a client according to an embodiment of the present application. The client is used for bridging with a communication device on a plurality of frequency bands (2.4G, 5G, 6G, as well as subsequent frequency bands that may be supported by Wi-Fi). Exemplarily, the client may be a mobile phone, a computer, a relay (RE), etc.; and the communication device may be a wireless access point (AP). The communication method may include steps below.

In step S810, protocol interaction processes on a plurality of frequency bands are activated, respectively, in response to a single-time bridge trigger operation.

Optionally, examples of the bridge trigger operation are similar to those described above with reference to FIG. 1.

For example, with respect to the WPS technology, the client may activate full channel scan in response to a single-time bridge trigger operation, select a communication device (AP) for bridge communication, and thus activate protocol interaction processes with the communication device on the plurality of frequency bands. For example, with respect to the Wi-Fi easy connect technology, the client establishes a connection with the network configurator (managing the communication device to be bridged) (e.g., through scanning the QR code of the client by the network configurator), in response to a single-time bridge trigger operation, so as to activate protocol interaction processes with the network configurator on the plurality of frequency bands.

In step S820, whether the client and the interaction device of the protocol interaction process support a same private protocol is determined, during the protocol interaction process on the first frequency band among the plurality of frequency bands.

Optionally, the interaction device with which the client performs the protocol interaction process may be a network configurator or a communication device.

For example, the multi-frequency bridge client performs standard protocol interaction with the communication device or the network configurator. During the protocol interaction process, the multi-frequency bridge client may announce manufacturer, model, product code thereof, and whether it supports a company private protocol. The communication device or the network configurator may recognize the above information announced by the multi-frequency bridge client.

Optionally, the client and the communication device may announce support thereof for the private protocol through a request-response pattern, or may also add relevant fields to the interaction message during the message interaction stage of the protocol interaction process to indicate support thereof for the private protocol.

For example, with respect to the WPS technology, the client may announce support thereof for the private protocol in probe request during the scan stage, and the communication device AP may announce support thereof for the private protocol in beacon or probe response; or, the client may perform interaction of the WPS standard protocol with the communication device AP, and add private protocol related fields in the protocol message during the message interaction stage, and the AP or the client may identify the fields passed by the interaction device and determine whether the interaction device supports the private protocol.

Optionally, the network configurator may read information about support of the client for the private protocol from the client, or the client and the network configurator may also add relevant fields in the interaction message during the protocol interaction process to indicate support thereof for the private protocol.

For example, with respect to the Wi-Fi easy connect technology, the client adds support information for the private protocol on the QR code, and the network configurator recognizes whether the client supports the private protocol when scanning the QR code during the bootstrap stage of the client. Or, during standard protocol interaction with the network configurator, the client may add private protocol related fields to the protocol message during the verification stage, and the client and the network configurator may identify these fields and determine whether the interaction device supports the private protocol.

In step S830, in response to determining that they support the same private protocol, after completing the protocol interaction process on the first frequency band among the plurality of frequency bands, configuration information on the first frequency band and at least one other frequency band are acquired from the interaction device, protocol interaction processes on other frequency bands except for the first frequency band are terminated, and the configuration information on the first frequency band and the at least one other frequency band are used for bridging with the communication device on the corresponding frequency bands.

For example, in a case where the multi-frequency bridge client supports the same private protocol as the communication device or the network configurator, after standard protocol interaction, the communication device or the network configurator pushes configuration information of all frequency bands or a part of all frequency bands to the multi-frequency bridge client, and the multi-frequency bridge client may terminate the protocol interaction processes on other frequency bands and directly use the configuration information for bridging with the the multi-frequency AP on at least a part of frequency bands.

After the client and the communication device AP complete interaction of the standard protocol message on the first frequency band, if the communication device AP and the client support the same private protocol, then the AP pushes configuration information of at least a part of frequency bands to the client, and the client stops the protocol interaction processes on other frequency bands and uses the obtained configuration information for bridging with the AP on the at least a part of frequency bands.

After the client and the network configurator complete interaction of the standard protocol message on the first frequency band, if the network configurator and the client support the same private protocol, then the network configurator pushes configuration information of at least a part of frequency bands including the first frequency band to the client, and the client stops the protocol interaction processes on other frequency bands except for the first frequency band, and uses the obtained configuration information for bridging with the AP on the at least a part of frequency bands.

In addition, optionally, the communication method may further optionally include step S840.

In step S840, the communication method as described with reference to FIG. 5 to FIG. 7 for bridging with the communication device is used, in response to determining that the client and the interaction device of the protocol interaction process do not support the same private protocol.

That is, if the private protocol is not applicable, then the stage of the protocol interaction processes on respective other frequency bands except for the first frequency band (the frequency band on which the protocol interaction process is completed) as described above is used to determine the bridge type of the AP, so as to determine whether to use the SSID-based retrieval method as described in FIG. 3 to FIG. 4B to acquire the configuration information or to wait for a preset time delay to acquire configuration information of the other frequency bands, to complete bridge with the AP on a plurality of frequency bands.

Optionally, sometimes the communication device or the network configurator does not explicitly or actively notify the client whether it supports the private protocol, but rather requires query from the client.

Therefore, the communication method 800 of FIG. 8 may further optionally include step S850.

In step S850, in response to being incapable of determining whether the client and the interaction device support the same private protocol, after completing the protocol interaction process on the first frequency band among the plurality of frequency bands, configuration information on the first frequency band is acquired from the interaction device, the configuration information on the first frequency band is used for bridging with the communication device on the first frequency band, and whether the communication device supports the predetermined private protocol is queried; and, in a case where the communication device supports the predetermined private protocol, configuration information on the first frequency band and at least one other frequency band are acquired from the communication device, protocol interaction processes on other frequency bands except for the first frequency band are terminated, and the configuration information on the first frequency band and the at least one other frequency band are used for bridging with the communication device on corresponding frequency band; and, in a case where the communication device does not support the predetermined private protocol, the communication method as described with reference to FIG. 5 to FIG. 7 is used for communication with the communication device.

For example, with respect to the WPS technology, in response to the client and the AP being incapable of identifying whether the interaction device supports the private protocol, after the client and the AP complete standard protocol interaction on the first frequency band, the AP pushes the configuration information of the first frequency band to the client. The client uses the configuration information for bridging with the AP on the first frequency band, and then sends a query message to the AP to query whether the AP supports the private protocol. In response to the AP supporting the private protocol, the AP sends configuration information of the first frequency band and at least a part of other frequency bands to the client. The client stops the protocol interaction processes on the other frequency bands except for the first frequency band, and uses the obtained configuration information for bridging with the AP on these frequency bands. In response to the AP not responding to the query message sent by the client, the client is incapable of using the private protocol to acquire the configuration information for communication. Therefore, the communication method as described with reference to FIG. 5 to FIG. 7 is used.

With respect to the Wi-Fi easy connect technology, in response to the client and the network configurator being incapable of identifying whether the interaction device supports the private protocol, after the client and the network configurator complete standard protocol interaction on one frequency band, the network configurator pushes the configuration information of the first frequency band to the client. The client uses the configuration information for bridging with the communication device AP on the first frequency band, and then sends a query message to the AP to query whether the AP supports the private protocol. In response to the AP supporting the private protocol, the AP will send configuration information of at least a part of frequency bands including the first frequency band to the client. The client will stop the protocol interaction processes on other frequency bands except for the first frequency band, and use the obtained configuration information for bridging with the AP on the at least a part of frequency bands. In response to the AP not responding to the query message sent by the client, the client is incapable of using the private protocol to obtain configuration information for communication. Therefore, the communication method as described with reference to FIG. 5 to FIG. 7 is used.

By using the communication method of the client as described with reference to FIG. 8, it may be determined based on support for the private protocol whether the configuration information of all desired frequency bands may be directly acquired from the network configurator or the communication device AP, so as to quickly complete bridge on the plurality of frequency bands in a case of supporting the same private protocol.

Figure 9:
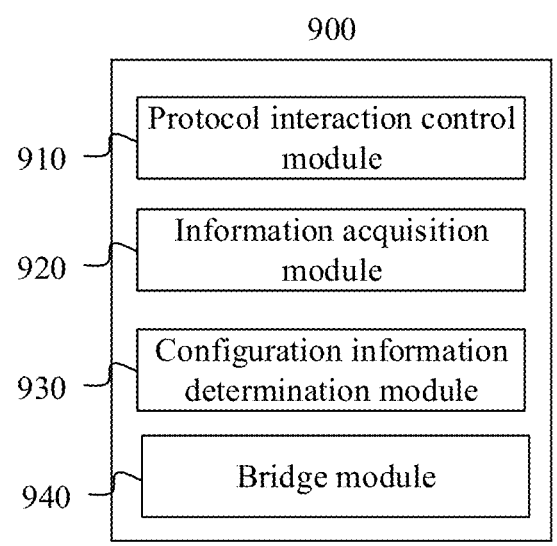
FIG. 9 to FIG. 11 are structural block diagrams of a client provided by an embodiment of the present disclosure.

Referring to FIG. 9, FIG. 9 is a structural block diagram of a client 900 provided by an embodiment of the present disclosure. The client is used for bridging with a communication device on a plurality of frequency bands (2.4G, 5G, 6G, as well as subsequent frequency bands that may be supported by Wi-Fi). Exemplarily, the client may be a mobile phone, a computer, a relay (RE), etc.; and the communication device may be a wireless access point (AP).

In FIG. 9, the client 900 may include a protocol interaction control module 910, an information acquisition module 920, a configuration information determination module 930 and a bridge module 940.

For example, the protocol interaction control module 910 activates the protocol interaction processes associated with the single-frequency bridge communication device on the plurality of frequency bands, respectively, in response to a single-time bridge trigger operation.

The information acquisition module 920 acquires device information of respective communication devices on each frequency band among the plurality of frequency bands in response to a single-time bridge trigger operation, and acquires configuration information on the first frequency band for bridging with the single-frequency bridge communication device, in response to determining that the protocol interaction process on the first frequency band is completed.

The configuration information determination module 930 determines configuration information on at least one other frequency band except for the first frequency band, based on the configuration information on the first frequency band and the device information of the respective communication devices on each frequency band.

The bridge module 940 uses the configuration information on the first frequency band and the determined configuration information on the at least one other frequency band, for bridging with the single-frequency bridge communication device on the corresponding frequency bands among the plurality of frequency bands.

It is noted that the description of the communication method of the client shown in FIG. 3 to FIG. 4B may be referred to for operation processes of respective modules in the multi-frequency bridge client 900 according to the embodiment of the present disclosure, and each module may correspondingly include a plurality of sub-modules, or the the multi-frequency bridge client may also be divided into more or fewer modules or sub-modules in other manners, and no details will be repeated here.

As compared with the prior art, the client 900 disclosed by the embodiments of the present disclosure, in a case of bridging with a single-frequency bridge communication device to implement communication, after acquiring configuration information of one frequency band, may obtain configuration information on other frequency bands based on the SSID-based retrieval method according to the configuration information and the saved device information, to quickly use the configuration information to implement bridge with the communication device on a plurality of frequency bands, without waiting for a longer time (e.g., two minutes) specified in the protocol. Therefore, bridge time may be shortened.

Figure 10:
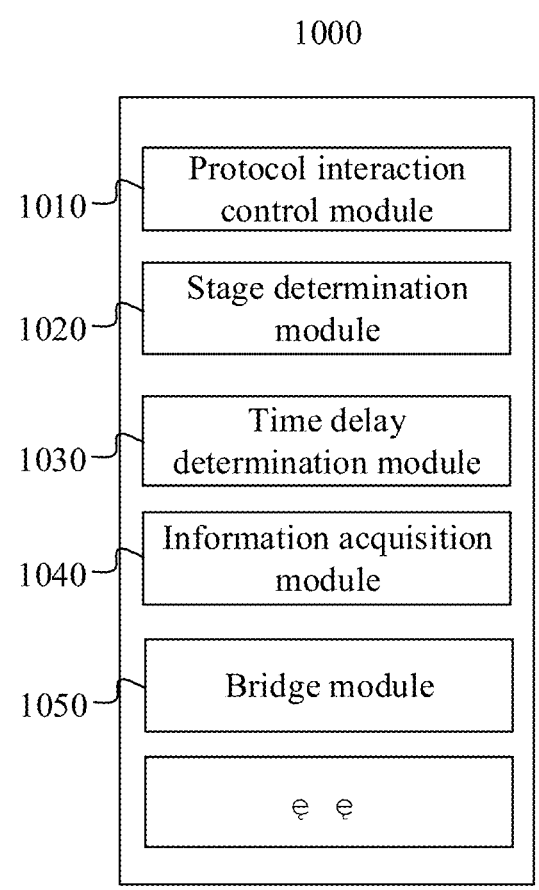

Referring to FIG. 10, FIG. 10 is a structural block diagram of a client 1000 provided by an embodiment of the present disclosure. The client is used for bridging with a communication device on a plurality of frequency bands (2.4G, 5G, 6G, as well as subsequent frequency bands that may be supported by Wi-Fi). Exemplarily, the client may be a mobile phone, a computer, a relay (RE), etc., and the communication device may be a wireless access point (AP).

In FIG. 10, the client 1000 may include a protocol interaction control module 1010, a stage determination module 1020, a time delay determination module 1030, an information acquisition module 1040 and a bridge module 1050. In addition, for compatibility with the single-frequency bridge AP and the multi-frequency bridge AP, the client 1000 may further optionally include respective modules in the client as shown in FIG. 9 or integrate functions thereof. For example, the protocol interaction control module 1010, the information acquisition module 1040 and the bridge module 1050 in FIG. 10 may be the same as the relevant modules in FIG. 9.

The protocol interaction control module 1010 activates the protocol interaction processes on the plurality of frequency bands, respectively, in response to a single-time bridge trigger operation.

The stage determination module 1020 determine stages of the protocol interaction processes on respective other frequency bands except for the first frequency band, in response to determining that the protocol interaction process is completed on the first frequency band, and the configuration information acquisition module 1040 acquires configuration information on the first frequency band.

The time delay determination module 1030 determines time delays respectively corresponding to the respective other frequency bands, according to the stages of the protocol interaction processes on the respective other frequency bands when completing the protocol interaction process on the first frequency band, and determines for each frequency band among the respective other frequency bands whether the protocol interaction process on the frequency band is completed within the time delay corresponding to the frequency band.

In a case where none of the protocol interaction processes on the respective other frequency bands is completed within the time delay corresponding to each frequency band among the respective other frequency bands, respective modules of the client in FIG. 9 and actions corresponding thereto may be used to implement bridging with the single-frequency communication device.

Optionally, in a case where the protocol interaction process on at least one frequency band is completed within the time delay corresponding to the at least one frequency band, the information acquisition module 1040 acquires configuration information on the at least one frequency band, and the bridge module 1050 uses the configuration information on the first frequency band and the obtained configuration information on the at least one frequency band for bridging with the communication device on corresponding frequency bands among the plurality of frequency bands.

It is noted that the description of the communication method of the client shown in FIG. 7 to FIG. 9 may be referred to for operation processes of respective modules in the multi-frequency bridge client 1000 according to the embodiment of the present disclosure, and each module may correspondingly include a plurality of sub-modules, or the multi-frequency bridge client may also be divided into more or fewer modules or sub-modules in other manners, and no details will be repeated here.

As compared with the prior art, on the basis of advantages of the client 1000, the client 1000 disclosed by the embodiment of the present disclosure may determine the bridge type of the AP based on the stage of the protocol interaction process on each second frequency band except for the first frequency band on which the protocol interaction process is completed, so as to determine whether to use the SSID-based retrieval method as described in FIG. 3 to FIG. 4B to acquire the configuration information or to wait for a preset time delay to acquire configuration information of other frequency bands, to complete bridge with the AP on all frequency bands, which, thus, may implement compatibility with a single-frequency bridge communication device and a multi-frequency bridge communication device.

Figure 11:
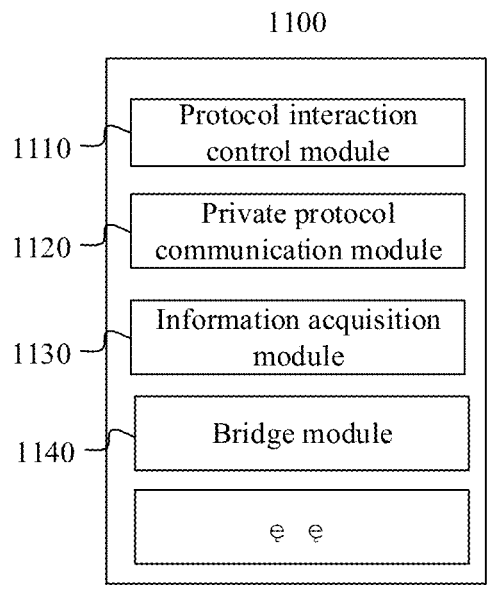

Referring to FIG. 11, FIG. 11 is a structural block diagram of a client 1100 provided by an embodiment of the present disclosure. The client is used for bridging with a communication device on a plurality of frequency bands (2.4G, 5G, 6G, as well as subsequent frequency bands that may be supported by Wi-Fi). Exemplarily, the client may be a mobile phone, a computer, a relay (RE), etc., and the communication device may be a wireless access point (AP).

In FIG. 11, the client 1100 may include a protocol interaction control module 1110, a private protocol communication module 1120, an information acquisition module 1130 and a bridge module 1140. In addition, in order to communicate with the communication device even in a case of not supporting the private protocol, the client 1100 may further optionally include respective modules in the client as shown in FIG. 10 or integrate functions thereof.

The protocol interaction control module 1110 activates the protocol interaction processes on the plurality of frequency bands, respectively, in response to a single-time bridge trigger operation.

During the protocol interaction process performed by the information acquisition module 1130 on the first frequency band among the plurality of frequency bands, in a case where the private protocol communication module 1120 determines that it supports the same private protocol as the interaction device of the protocol interaction process, after completing the protocol interaction process on the first frequency band among the plurality of frequency bands, the information acquisition module 1130 acquires configuration information on the first frequency band and at least one other frequency band from the interaction device, the protocol interaction control module 1110 stops protocol interaction processes on other frequency bands except for the first frequency band, and the bridge module 1140 uses the configuration information of the first frequency band and the configuration information of the at least one other frequency band for bridging with the communication device on corresponding frequency bands.

Optionally, in a case where the private protocol communication module 1120 determines that it does not support the same private protocol as the interaction device of the protocol interaction process, respective modules of the client in FIG. 10 and actions corresponding thereto are used to complete communication with the communication device on the plurality of frequency bands.

Besides, optionally, in a case where the private protocol communication module 1120 is incapable of determining whether the client and the interaction device support the same private protocol, after completing the protocol interaction process on the first frequency band among the plurality of frequency bands, the information acquisition module 1130 acquires configuration information on the first frequency band from the interaction device, the bridge module 1140 uses the configuration information on the first frequency band for bridge with the communication device on the first frequency band, the information acquisition module 1130 queries the communication device on whether the communication device supports the predetermined private protocol, and acquires configuration information on at least one frequency band including the first frequency band from the communication device, in a case where the communication device supports the predetermined private protocol, the protocol interaction control module 1110 stops the protocol interaction process on each frequency band except for the first frequency band, and the bridge module 1140 uses the configuration information on the at least one frequency band for bridging with the communication device on the at least one frequency band; and in a case where the communication device does not support the predetermined private protocol, respective modules of the client in FIG. 10 and actions corresponding thereto may be used to complete bridge with the communication device.

As compared with the prior art, on the basis of advantages of the client 900 to the client 1000, the client 1100 disclosed by the embodiment of the present disclosure may determine based on support for the private protocol whether to directly acquire configuration information of all frequency bands from the network configurator or the communication device AP, so as to quickly complete bridge on all frequency bands in a case of supporting the same private protocol.

Figure 12:
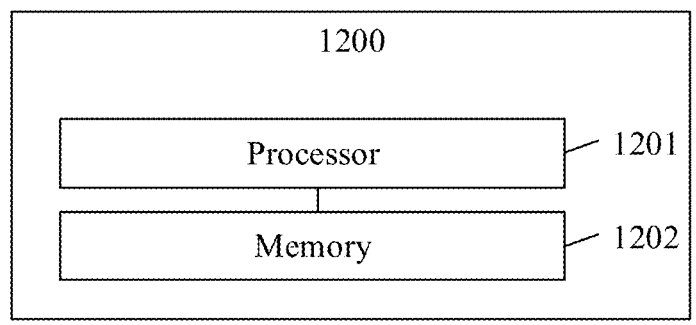
FIG. 12 is a structural block diagram of a client provided by an embodiment of the present disclosure.

Referring to FIG. 12, FIG. 12 is a structural block diagram of a client 1200 provided by an embodiment of the present disclosure. The client 1200 includes: a processor 1201, a memory 1202, and computer programs stored in the memory 1202 that may run on the processor 1201. The processor 1201, when executing the computer programs, implements the steps of the communication method of the client according to respective embodiments as described above with reference to FIG. 3 to FIG. 8. Or, the processor 1201 implements the functions of the respective modules of the apparatus according to respective embodiments as described above in FIG. 9 to FIG. 11 when executing the computer program.

Exemplarily, the computer programs may be divided into one or more modules/units. The one or more modules/units are stored in the memory 1202 and executed by the processor 1201 to complete the present disclosure. The one or more modules/units may be a series of computer program instruction segments capable of completing specific functions, and the instruction segments are configured to describe the execution process of the computer program in the client 1200.

The client may be a desktop computer, a laptop, a palmtop computer, a cloud server, and/or another computing device. The client 1200 may include, but is not limited to, a processor 1201 and a memory 1202. Those skilled in the art may understand that the schematic diagram is only an example of the the multi-frequency bridge client 1200, and does not constitute a limitation on the client 1200. It may include more or fewer components than the diagram, or combinations of certain components, or different components. For example, the client may further include an input/output device, a network access device, a bus, etc.

The processor 1201 may be a central processing unit (CPU), or may also be other general-purpose processor, a digital signal processor (DSP), an application specific integrated circuit (ASIC), a field-programmable gate array (FPGA), or other programmable logic device, a discrete gate or a transistor logic device, and a discrete hardware component, etc. The general-purpose processor may be a microprocessor or any conventional processor, etc. The processor 1201 is a control center of the client 1200, and connects respective parts of the entire client 1200 through respective interfaces and circuits.

The memory 1202 may be configured to store the computer program and/or modules, and the processor 1201 implements various functions of the client 1200 by running or executing the computer program and/or modules stored in the memory 1202, and calling data stored in the memory 1202. The memory 1202 may mainly include a program storage region and a data storage region, where, the program storage region may store an operating system, an application required for at least one function (e.g., a sound playback function, an image playback function, etc.), etc., and the data storage region may store data created based on use of a mobile phone (e.g., audio data, phone book, etc.). In addition, the memory 1202 may include a high-speed random access memory, or may also include a nonvolatile memory, for example, a hard drive, a memory, a plug-in hard drive, a smart media card (SMC), a secure digital (SD) card, a flash card, at least one disk storage device, a flash device, or other volatile solid-state storage devices.

When implemented in a form of software functional units and sold or used as independent products, the modules/units integrated by the client 1200 may be stored in a computer-readable storage medium. Based on such understanding, all or part of the processes in the method according to the above-described embodiments of the present disclosure, may also be completed by instructing relevant hardware through computer programs. The computer programs may be stored in a computer-readable storage medium, and when executed by the processor 1201, the computer programs may implement the steps of the above-described methods of respective embodiments. The computer programs include computer program codes, and the computer program codes may be in the form of source codes, object codes, executable files, or some intermediate forms. The computer-readable medium may include: any entity or apparatus capable of carrying the computer program codes, a record medium, a USB flash drive, a portable hard drive, a magnetic disc, an optical disc, a computer memory, a read-only memory (ROM), a random access memory (RAM), an electrical carrier signal, a telecommunications signal, and a software distribution medium, etc.

It should be noted that the apparatus embodiments as described above are only schematic, where, the units described as separate parts may or may not be physically separated, and the parts shown as units may or may not be physical units, i.e., they may be located in one place, or may also be distributed to a plurality of network units. According to actual needs, some or all of the units may be selected to achieve the objective of the solution of this embodiment. In addition, in the accompanying drawings of the apparatus in respective embodiments provided by the present disclosure, the connection relationship between units indicates that they have communication connections, which may be specifically implemented as one or more communication buses or signal lines. Those ordinarily skilled in the art may understand and implement without any inventive labor.

Figure 13:
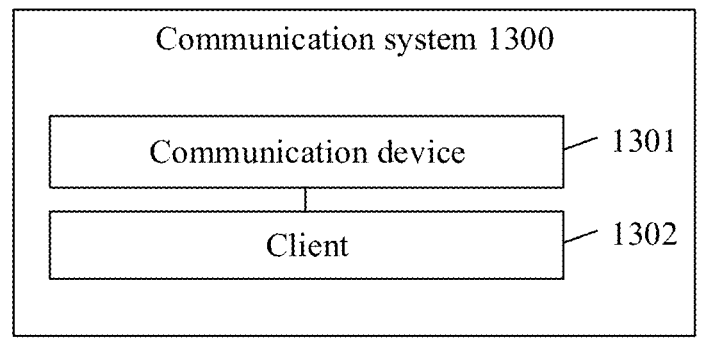
FIG. 13 is a structural block diagram of a communication system provided by an embodiment of the present disclosure.

Referring to FIG. 13, FIG. 13 is a structural block diagram of a communication system 1300 provided by an embodiment of the present disclosure. The communication system 1300 includes at least one communication device 1301 and the client 1200 according to the above-described embodiment.

The operation process of the client 1200 according to the above-described embodiments may be referred to for specific operation processes of the client 1200 and the communication device 1301, and no details will be repeated here.

As compared with the prior art, the client 100 in the communication system 1300 disclosed by the embodiments of the present disclosure, allows quick bridge with a single-frequency bridge AP based on configuration information of other frequency bands obtained by using an SSID retrieval method during communication with the single-frequency bridge AP except the frequency band on which interaction is completed. In addition, a bridge type of the AP may be determined based on the stage of a protocol interaction process on each frequency band, to determine whether to use the SSID-based retrieval method or to wait for a preset time delay to acquire configuration information of other frequency bands, in order to complete bridge with the AP on all frequency bands, which may implement compatibility of communication with a single-frequency bridge communication device and a multi-frequency bridge communication device. Moreover, configuration information of all frequency bands may be acquired from the network configurator or the AP which the client is communicating based on support for a private protocol, so as to further quickly complete bridge with the AP on all frequency bands.

The above is only a preferred implementation of the present disclosure. It should be pointed out that for those ordinarily skilled in the art, several improvements and embellishments may be made without departing from the principles of the present disclosure. These improvements and embellishments should also be considered as the scope of protection of the present disclosure.

The invention claimed is:

1. A communication method of a client, wherein, the client is used for bridging with a communication device on a plurality of frequency bands, and the communication method comprises:
    activating protocol interaction processes on the plurality of frequency bands, respectively, in response to a single-time bridge trigger operation;
    acquiring configuration information on a first frequency band, and determining stages of the protocol interaction processes on respective other frequency bands except for the first frequency band, in response to determining that a protocol interaction process is completed on the first frequency band;
    determining time delays respectively corresponding to the respective other frequency bands, according to stages of the protocol interaction processes on the respective other frequency bands upon completing the protocol interaction process on the first frequency band;
    for each frequency band among the respective other frequency bands, determining whether a protocol interaction process on the frequency band is completed within a time delay corresponding to the frequency band; and
    in a case where none of the protocol interaction processes on the respective other frequency bands is completed within a time delay corresponding to each frequency band among the respective other frequency bands, terminating the protocol interaction processes on the respective other frequency bands, acquiring device information of respective communication devices on each frequency band among the plurality of frequency bands, determining configuration information on at least one other frequency band except for the first frequency band, based on the configuration information on the first frequency band and the device information of the respective communication devices on each frequency band, and using the configuration information on the first frequency band and the determined configuration information on the at least one other frequency band for bridging with the communication device on corresponding frequency bands.

2. The communication method according to claim 1, further comprising:
    in a case where a protocol interaction process on at least one frequency band among the respective other frequency bands is completed within a time delay corresponding to the at least one frequency band, acquiring configuration information on the at least one frequency band on which the protocol interaction process is completed, and using the configuration information on the at least one frequency band on which the protocol interaction process has been completed, for bridging with the communication device on corresponding frequency bands.

3. The communication method according to claim 1, wherein, the protocol interaction process is performed between the client and the communication device, and is divided into a scan stage, an authentication and association stage and a message interaction stage,
    the step of determining time delays respectively corresponding to respective other frequency bands according to stages of protocol interaction processes on the respective other frequency bands upon completing the protocol interaction process on the first frequency band, comprises: for each frequency band among the respective other frequency bands,
    in a case where the stage of the protocol interaction process on the frequency band is the scan stage, determining a first initial time delay having a first predetermined duration, and determining a first additional time delay, according to an update stage of the protocol interaction process on the frequency band at the end of the first initial time delay, the first initial time delay and the first additional time delay serving as the time delay corresponding to the frequency band;
    in a case where the stage of the protocol interaction process on the frequency band is the authentication and association stage, determining a second initial time delay having a second predetermined duration as the time delay corresponding to the frequency band; and
    in a case where the stage of the protocol interaction process on the frequency band is the message interaction stage, determining a third initial time delay having a third predetermined duration as the time delay corresponding to the frequency band, wherein the first predetermined duration is less than the third predetermined duration, and the third predetermined duration is less than the second predetermined duration.

4. The communication method according to claim 3, wherein, the step of determining a first additional time delay, according to an update stage of the protocol interaction process on the frequency band at the end of the first initial time delay, comprises:
in a case where the update stage at the end of the first initial time delay is the scan stage, determining the duration of the first additional time delay as 0;
in a case where the update stage at the end of the first initial time delay is the authentication and association stage, determining the first additional time delay to have the second predetermined duration; and
in a case where the update stage at the end of the first initial time delay is the message interaction stage, determining the first additional time delay to have the third predetermined duration.

5. The communication method according to claim 1, wherein, the protocol interaction process is performed between the client and a network configurator managing the communication device, and is divided into a bootstrap stage, a verification stage, a configuration stage, and a network access stage,
the step of determining time delays respectively corresponding to respective other frequency bands according to stages of protocol interaction processes on the respective other frequency bands upon completing the protocol interaction process on the first frequency band, comprises: for each frequency band among the respective other frequency bands,
in a case where the stage of the protocol interaction process on the frequency band is the bootstrap stage, determining a first initial time delay having a first predetermined duration, and determining a first additional time delay, according to an update stage of the protocol interaction process on the frequency band at the end of the first initial time delay, the first initial time delay and the first additional time delay serving as the time delay corresponding to the frequency band;
in a case where the stage of the protocol interaction process on the frequency band is the verification stage, determining a second initial time delay having a second predetermined duration as the time delay corresponding to the frequency band; and
in a case where the stage of the protocol interaction process on the frequency band is the configuration stage or the network access stage, determining a third initial time delay having a third predetermined duration as a time delay corresponding to the frequency band, wherein the first predetermined duration is less than the third predetermined duration, and the third predetermined duration is less than the second predetermined duration.

6. The communication method according to claim 5, wherein, the step of determining a first additional time delay, according to an update stage of the protocol interaction process on the frequency band at the end of the first initial time delay, comprises:
in a case where the update stage at the end of the first initial time delay is the bootstrap stage, determining the duration of the first additional time delay as 0;
in a case where the update stage at the end of the first initial time delay is the verification stage, determining the first additional time delay to have the second predetermined duration; and
in a case where the update stage at the end of the first initial time delay is the configuration stage or the network access stage, determining the first additional time delay to have the third predetermined duration.

7. The communication method according to claim 1, wherein, configuration information on each frequency band comprises SSID, encryption mode and key, and encryption modes and keys are the same on all frequency bands;
wherein, the step of determining configuration information on at least one other frequency band except for the first frequency band, based on the configuration information on the first frequency band and the device information of the respective communication devices on each frequency band, comprises:
determining, based on the configuration information on the first frequency band, encryption mode and key included in the configuration information on the at least one other frequency band; and
determining SSID included in the configuration information on the at least one other frequency band, based on the configuration information on the first frequency band and/or device information of all communication devices on each frequency band and using SSID retrieval method.

8. The communication method according to claim 7, wherein the device information of each communication device comprises SSID, and wherein, determining SSID included in the configuration information on the at least one other frequency band comprises:
acquiring SSID on the first frequency band based on the configuration information on the first frequency band; and
for each frequency band among the at least one other frequency band, determining that a communication device whose device information comprises the same SSID as the SSID on the first frequency band among respective communication devices on the frequency band is the same device as the single-frequency bridge communication device, and taking the SSID on the first frequency band as the SSID in the configuration information on the frequency band; or
wherein, the device information of each communication device comprises a MAC address and a UUID, and wherein determining SSID included in the configuration information on the at least one other frequency band comprises:
determining a first MAC address and a first UUID of the single-frequency bridge communication device on the first frequency band, based on the device information of the single-frequency bridge communication device on the first frequency band;
determining, based on the device information of respective communication devices on each frequency band among the at least one other frequency band, a second MAC address and a second UUID of each communication device on the frequency band; and
for each frequency band among the at least one other frequency band, determining that a communication device whose second MAC address meets a mapping rule with the first MAC address and whose second UUID is the same as the first UUID among the respective communication devices on the frequency band is the same device as the single-frequency bridge communication device, and taking the SSID in the device information of the determined communication device as the SSID in the configuration information on the frequency band; or wherein, the device information of each communication device comprises product information, and wherein determining SSID included in configuration information on each frequency band among the at least one other frequency band comprises:

determining first product information of the single-frequency bridge communication device based on the device information of the single-frequency bridge communication device on the first frequency band;

determining, based on device information of all communication devices on each frequency band among the at least one other frequency band, second product information of each communication devices on the frequency band; and for each frequency band among the at least one other frequency band, determining that a communication device whose second product information is the same as the first product information among all communication devices on the frequency band is the same device as the single-frequency bridge communication device, and taking the SSID in the device information of the determined communication device as the SSID in the configuration information on the frequency band; or wherein, the device information of each communication device comprises an SSID with a predetermined format, and wherein determining SSID included in configuration information on each frequency band among the at least one other frequency band comprises:

determining a first SSID embedded with the predetermined format of the single-frequency bridge communication device based on the device information of the single-frequency bridge communication device on the first frequency band;

determining, based on the device information of all communication devices on each frequency band among the at least one second frequency band, a second SSID embedded with the predetermined format of each communication device on the frequency band; and for each frequency band among the at least one second frequency band, determining that a communication device whose second SSID meets an association relationship with the first SSID among all communication devices on the frequency band is the same device as the single-frequency bridge communication device, and taking the second SSID in the device information of the determined communication device as the SSID in the configuration information on the frequency band.

9. A client, comprising a processor, a memory, and a computer program stored in the memory and configured to be executed by the processor, wherein, the processor, when executing the computer program, implements the communication method of the client according to claim 1.

* * * * *